(12) United States Patent
Tsai

(10) Patent No.: US 12,306,521 B2
(45) Date of Patent: May 20, 2025

(54) WAVELENGTH CONVERSION ELEMENT AND PROJECTION DEVICE

(71) Applicant: Coretronic Corporation, Hsin-Chu (TW)

(72) Inventor: Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 417 days.

(21) Appl. No.: 17/965,770

(22) Filed: Oct. 14, 2022

(65) Prior Publication Data

US 2023/0128443 A1    Apr. 27, 2023

(30) Foreign Application Priority Data

Oct. 21, 2021  (CN) .......................... 202122536851.6

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC .. G03B 21/204; G03B 21/2066; G03B 33/08; G02B 26/008; G02B 5/021; G02B 27/0927; G02B 5/0284
USPC .......................................................... 353/84
See application file for complete search history.

(56) References Cited

U.S. PATENT DOCUMENTS

| | | | | |
|---|---|---|---|---|
| 2009/0321771 A1* | 12/2009 | Hattori | ................ | H01S 5/02255 257/98 |
| 2019/0249833 A1* | 8/2019 | Hsu | ........ | G03B 21/204 |
| 2020/0371414 A1* | 11/2020 | Tsai | ............ | G03B 21/2066 |

FOREIGN PATENT DOCUMENTS

| | | | | |
|---|---|---|---|---|
| CN | 110658669 | | 1/2020 | |
| CN | 111022942 | | 4/2020 | |
| CN | 112114477 | | 12/2020 | |
| CN | 113238442 A | * | 8/2021 | ........... G02B 27/141 |
| TW | M565813 | | 8/2018 | |

* cited by examiner

*Primary Examiner* — Magda Cruz
(74) *Attorney, Agent, or Firm* — JCIPRNET

(57) ABSTRACT

A wavelength conversion element configured to receive an excitation light beam includes: a substrate configured to rotate about a central axis including a wavelength conversion region and a non-wavelength conversion region; and at least one wavelength conversion layer. When the substrate is rotated about the central axis, the non-wavelength conversion region and the wavelength conversion region alternately enter a transmission path of the excitation light beam. The substrate has a recessed portion located inside or outside of and surrounding the wavelength conversion region. The recessed portion includes an inclined surface. When the excitation light beam is incident on the inclined surface, the inclined surface reflects the excitation light beam to the wavelength conversion layer, and the wavelength conversion layer converts the excitation light beam into a converted beam. When the excitation light beam is incident on the non-wavelength conversion region, the non-wavelength conversion region reflects the excitation light beam.

20 Claims, 16 Drawing Sheets

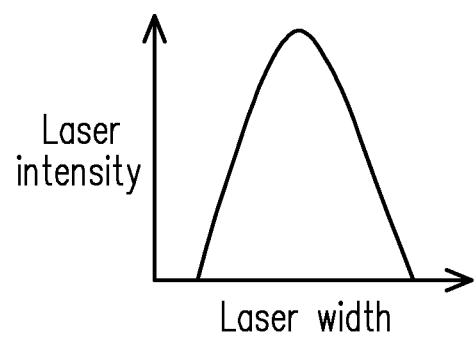
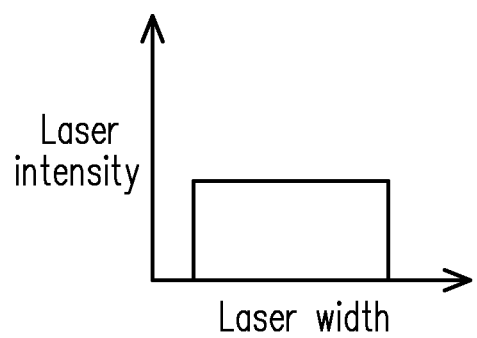
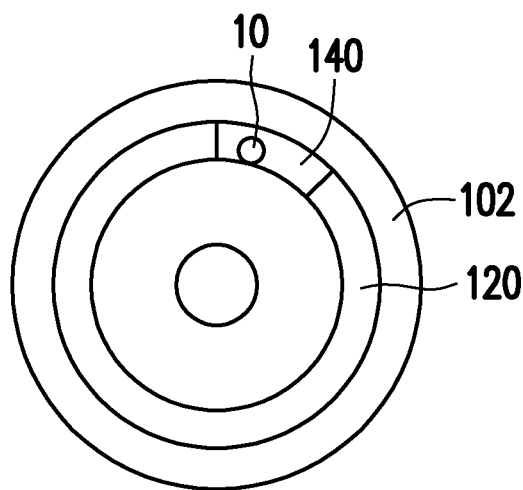
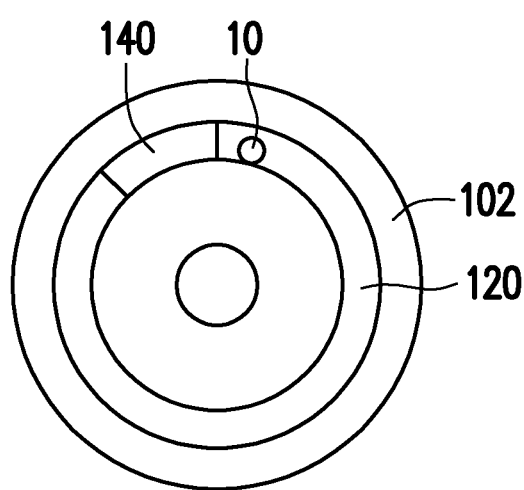
FIG. 2E   FIG. 2F

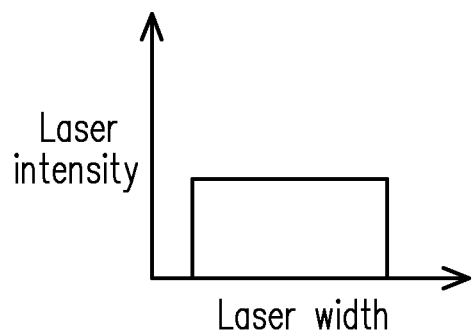
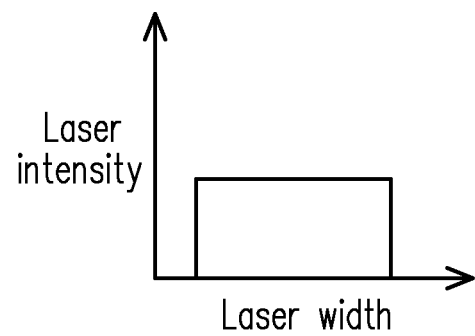
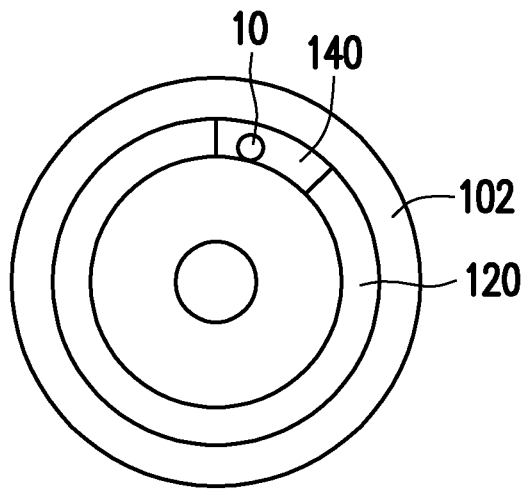
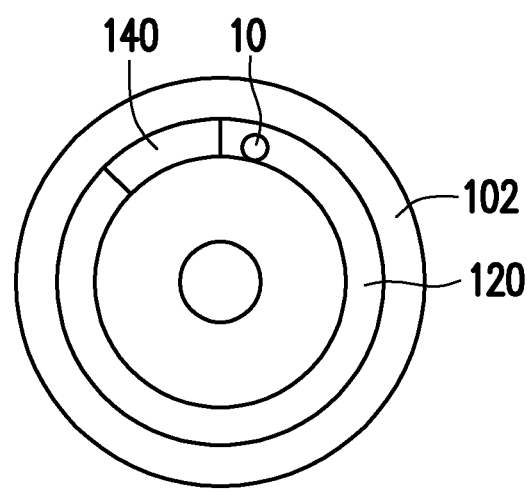
FIG. 5D  FIG. 5E

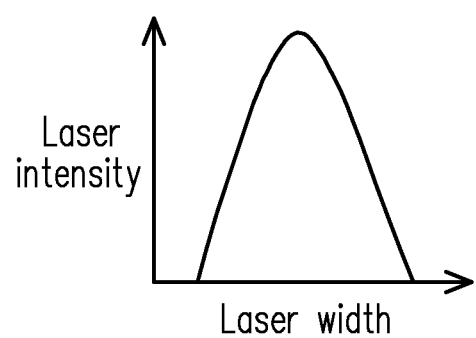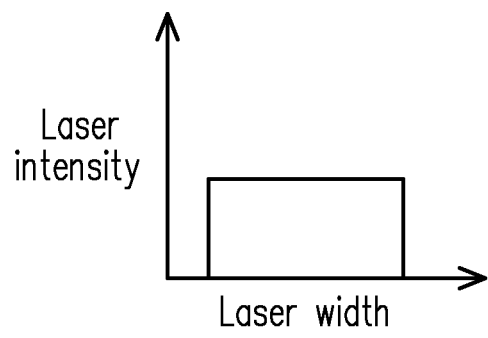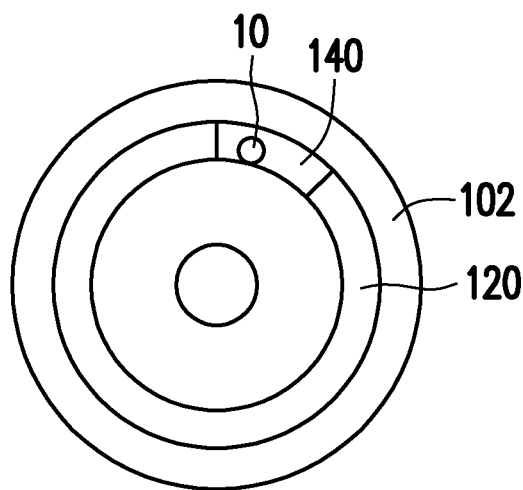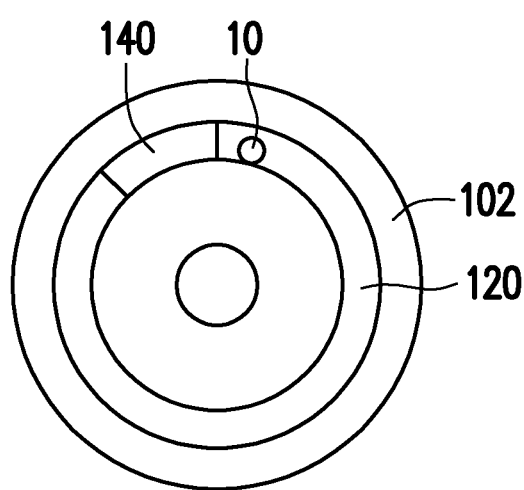
FIG. 6D  FIG. 6E

WAVELENGTH CONVERSION ELEMENT AND PROJECTION DEVICE

CROSS-REFERENCE TO RELATED APPLICATION

This application claims the priority benefit of China application serial no. 202122536851.6, filed on Oct. 21, 2021. The entirety of the above-mentioned patent application is hereby incorporated by reference herein and made a part of this specification.

BACKGROUND OF THE INVENTION

Field of the Invention

The invention relates to an optical element and an optical device, and in particular to a wavelength conversion element and a projection device.

Description of Related Art

When a laser is incident on a fluorescent wheel, the fluorescent material on the fluorescent wheel may be excited by the laser beam to produce colored lights of different wavelengths for use. Before the laser beam excites the fluorescent material of the fluorescent wheel, the laser beam is first converged into an elliptical light spot. The size of the light spot affects the conversion efficiency of the fluorescent material. When the light spot of the excitation light beam is too large, a more enlarged light spot is produced when the fluorescent material is excited. As a result, excited yellow light, green light, and red light cannot effectively enter the condenser lens in front of the fluorescent wheel and proceed to the designated light path. Eventually, the colored light that does not enter the condenser lens becomes stray light in the system, resulting in a decrease in system efficiency. Conversely, if the light spot of the laser beam is reduced, the generation of stray light may be avoided. However, since the reduction of the light spot causes the laser energy to be more concentrated, it is easy to burn the fluorescent material on the fluorescent wheel or cause the conversion efficiency of the fluorescent material to drop significantly.

Moreover, when the laser beam is focused on the fluorescent material on the fluorescent wheel, the light spot of the laser beam appears in the form of a Gaussian distribution. At this time, the energy density distribution of the light spot of the laser beam has a larger peak power density, so that the fluorescent material has worse conversion efficiency. In prior art, a homogenizing element (fly-eye) is added on the optical path from the laser beam to the fluorescent wheel, so that the energy density distribution of the light spot of the laser beam on the fluorescent wheel presents a plateau distribution. That is, the peak power density is lower, thereby improving the conversion efficiency of the fluorescent material. However, such a design increases the size of the system and increases production cost.

The content of "Description of Related Art" is only intended to facilitate understanding of the content of the invention, and therefore the content disclosed in "Description of Related Art" may contain some prior art techniques not known to those having ordinary skill in the art. The content disclosed in "Description of Related Art" does not represent issues to be solved by the content or one or a plurality of embodiments of the invention, and is known or recognized by those having ordinary skill in the art prior to the application of the invention.

SUMMARY OF THE INVENTION

The invention provides a wavelength conversion element and a projection device. A fluorescent color wheel is respectively provided with two blocks having homogenizing and wavelength conversion functions, an excitation light beam is first homogenized via the homogenizing block and then enters the wavelength conversion block, so that the peak energy density of the excitation light beam is lower than that of the prior art without the homogenizing function, thereby improving the conversion efficiency of the fluorescent wheel and avoiding the risk of burnout.

Other goals and advantages of the invention may be better understood from the technical features disclosed by the invention.

In order to achieve one or part or all of the above objects or other objects, an embodiment of the invention provides a wavelength conversion element configured to receive an excitation light beam, wherein the wavelength conversion element includes: a substrate and at least one wavelength conversion layer; wherein, the substrate is configured to rotate about a central axis, the substrate includes a wavelength conversion region and a non-wavelength conversion region, and the wavelength conversion region and the non-wavelength conversion region are adjacently disposed on the substrate and form a ring shape, wherein when the substrate is rotated about the central axis, the non-wavelength conversion region and the wavelength conversion region alternately enter a transmission path of the excitation light beam; and the substrate has a recessed portion, the recessed portion is located inside or outside the wavelength conversion region and surrounds the wavelength conversion region, the recessed portion and the at least one wavelength conversion layer are located on a surface of the substrate, and the recessed portion is recessed into the substrate relative to the surface, and the recessed portion includes an inclined surface; wherein when the excitation light beam is incident on the inclined surface, the inclined surface reflects the excitation light beam to the at least one wavelength conversion layer, when the excitation light beam is incident on the at least one wavelength conversion layer, the at least one wavelength conversion layer converts the excitation light beam into a converted beam, and when the excitation light beam is incident on the non-wavelength conversion region, the non-wavelength conversion region reflects the excitation light beam.

The invention further provides a projection device, including: a light source, a wavelength conversion element, a condenser lens, a light valve, and a projection lens, wherein the light source is configured to emit an excitation light beam; the wavelength conversion element is disposed on a transmission path of the excitation light beam, and the wavelength conversion element includes: a substrate and at least one wavelength conversion layer; wherein the substrate is configured to rotate about a central axis, the substrate includes a wavelength conversion region and a non-wavelength conversion region, and the wavelength conversion region and the non-wavelength conversion region are adjacently disposed on the substrate and form a ring shape, wherein when the substrate is rotated about the central axis, the non-wavelength conversion region and the wavelength conversion region alternately enter the transmission path of the excitation light beam; and the substrate has a recessed portion, the recessed portion is located inside or outside the wavelength conversion region and surrounds the wavelength conversion region, the recessed portion and the at least one wavelength conversion layer are located on a surface of the substrate, and the recessed portion is recessed into the substrate relative to the surface, and the recessed portion includes an inclined surface; wherein when the excitation light beam is incident on the inclined surface, the inclined surface reflects the excitation light beam to the at least one wavelength conversion layer, when the excitation light beam is incident on the at least one wavelength conversion layer, the at least one wavelength conversion layer converts the excitation light beam into a converted beam, and when the excitation light beam is incident on the non-wavelength conversion region, the non-wavelength conversion region reflects the excitation light beam, and the wavelength conversion element outputs at least one of the converted beam and the excitation light beam as an illumination beam; the condenser lens is disposed between the light source and the wavelength conversion element and located on a transmission path of the illumination beam; the light valve is disposed on the transmission path of the illumination beam from the condenser lens and configured to convert the illumination beam into an image beam; and the projection lens is disposed on an optical path of the image beam.

Based on the above, the invention may improve the heat dissipation efficiency and excitation or reflection efficiency of the fluorescent wheel, and at the same time improve the structural strength and reliability of the fluorescent wheel. In the invention, the size of the projection device may be reduced and system cost may be effectively reduced at the same time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2E is an energy distribution diagram of an excitation light beam according to an embodiment of the invention.

FIG. 2F is an energy distribution diagram of a converted beam according to an embodiment of the invention.

FIG. 5D is an energy distribution diagram of an excitation light beam according to an embodiment of the invention.

FIG. 5E is an energy distribution diagram of a converted beam according to an embodiment of the invention.

FIG. 6D is an energy distribution diagram of an excitation light beam according to an embodiment of the invention.

FIG. 6E is an energy distribution diagram of a converted beam according to an embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component herein facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
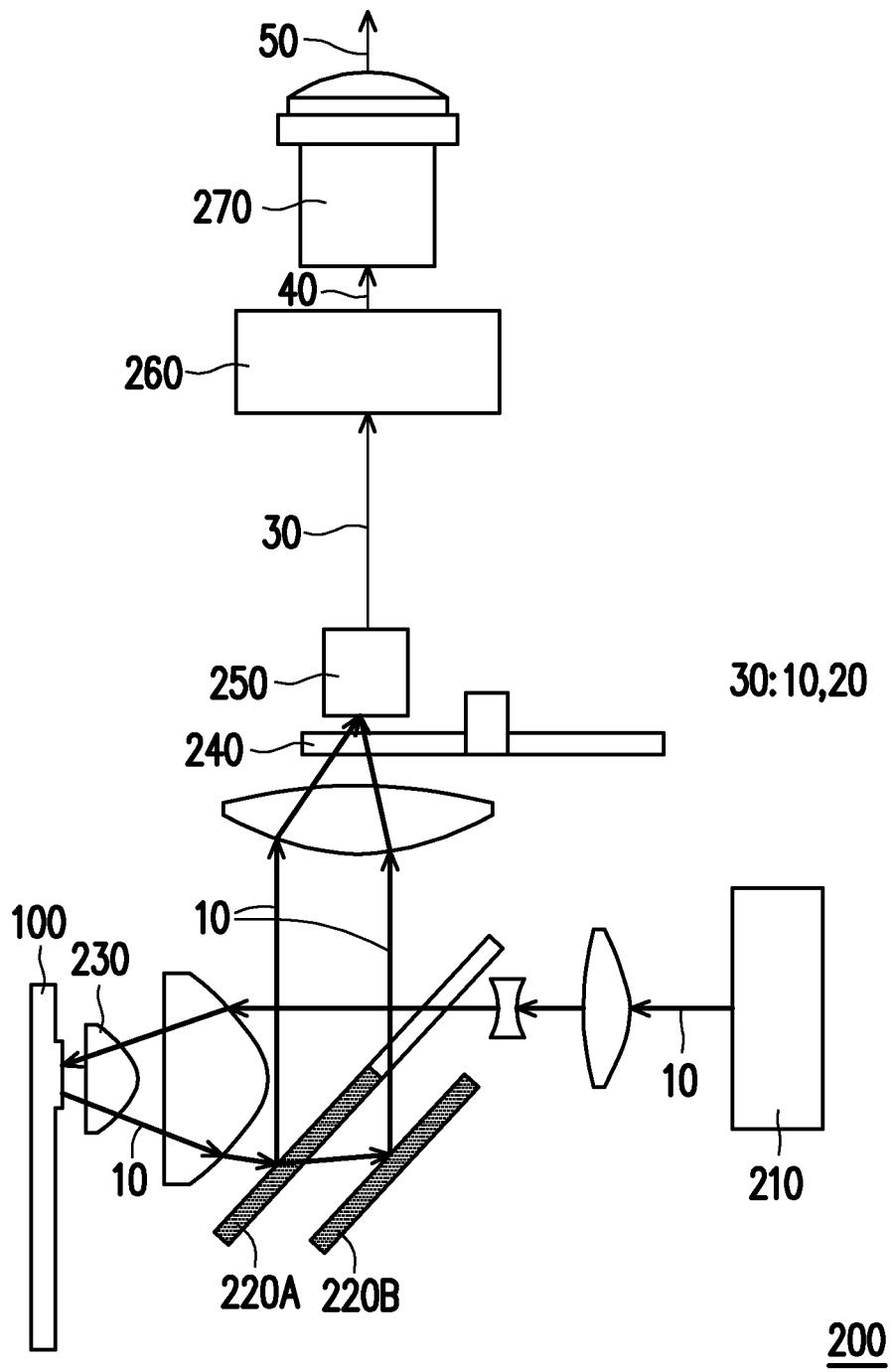
FIG. 1A is a schematic diagram of a projection device according to an embodiment of the invention.
Figure 1B:
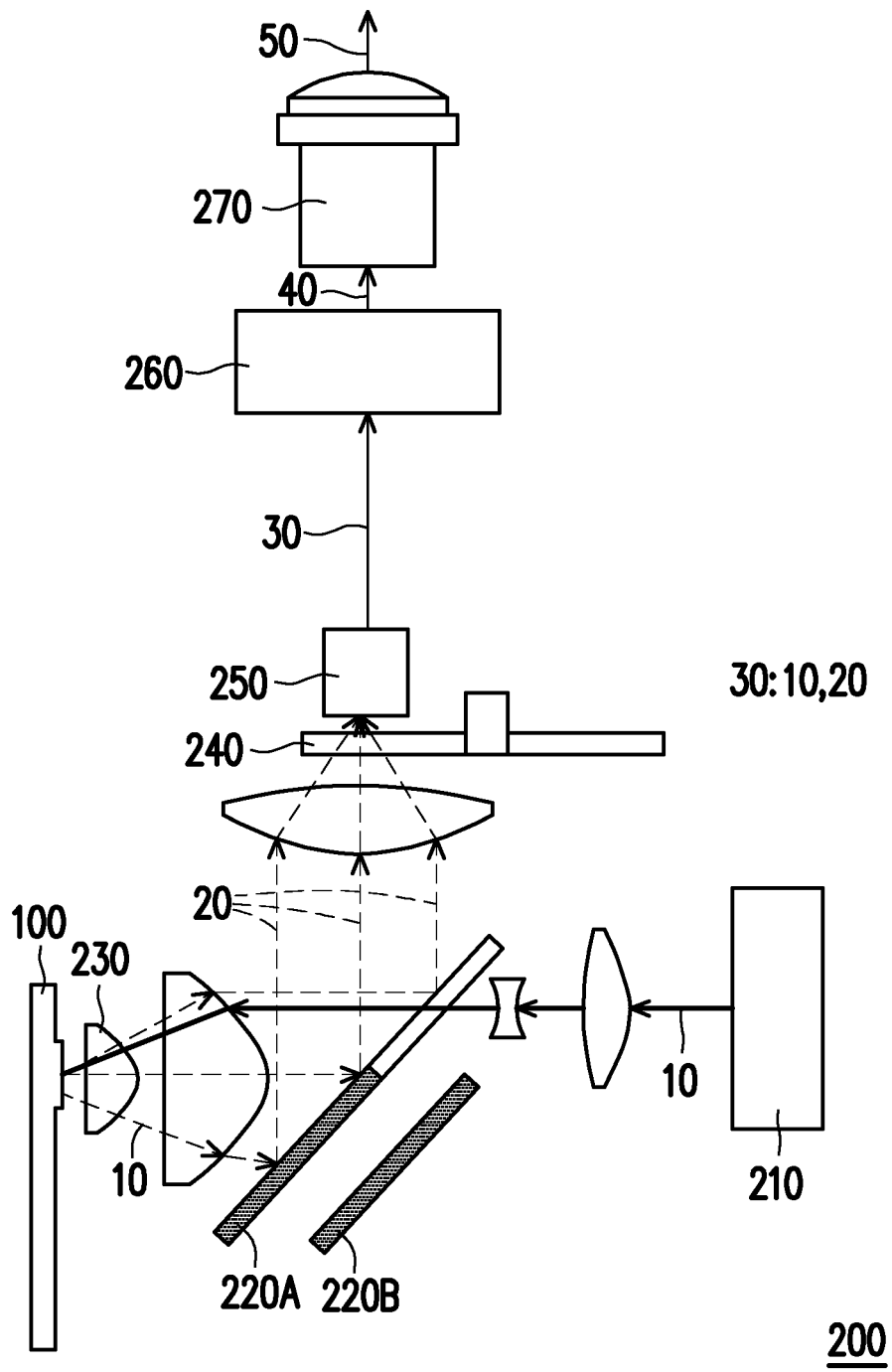
FIG. 1B is another schematic diagram of a projection device according to an embodiment of the invention.

FIG. 1A and FIG. 1B are architecture schematics of a projection device of an embodiment of the invention. Referring to FIG. 1A and FIG. 1B, a projection device 200 includes a light source 210, a light-splitting element 220A, a light-splitting element 220B, a wavelength conversion element 100, a condenser lens 230, a light valve 260, and a projection lens 270.

As shown in FIG. 1A and FIG. 1B, in the present embodiment, the light source 210 is suitable for emitting an excitation light beam 10. In the present embodiment, the light source 210 may be, for example, a solid-state light-emitting element. In the present embodiment, the light source 210 is an excitation light source, and the excitation light beam 10 is a blue excitation light beam. For example, the light source 210 may include a plurality of blue laser diodes (not shown) arranged in an array, but the invention is not limited thereto.

As shown in FIG. 1A and FIG. 1B, the light-splitting element 220A and the light-splitting element 220B are respectively disposed on the transmission path of the excitation light beam 10 and located between the light source 210 and the wavelength conversion element 100. Specifically, the light-splitting element 220A and the light-splitting element 220B may be partially-transmissive partially-reflective elements, color separation elements, polarizing splitting elements, or various other elements that may separate a light beam. In the present embodiment, a partial region of the light-splitting element 220A may allow a blue light beam to penetrate and reflect light beams of other colors, another partial region thereof may allow a blue light beam to partially penetrate and partially reflect the blue light beam, and the light-splitting element 220B may be a full-waveband reflective element or a reflective element reflecting the blue light beam. A partial region of the light-splitting element 220A corresponds to the excitation light beam 10 emitted by the light source 210, while another partial region is not located on the transmission path of the excitation light beam 10 emitted from the light source 210. In other words, a partial region of the light-splitting element 220A may allow the blue excitation light beam 10 from the light source 210 to penetrate and be transmitted to the wavelength conversion element 100.

As shown in FIG. 1A and FIG. 1B, the wavelength conversion element 100 is located on the transmission path of the excitation light beam 10. The wavelength conversion element 100 has a non-wavelength conversion region (not shown) and a wavelength conversion region (not shown) that alternately enter the transmission path of the excitation light beam 10. The wavelength conversion region of the wavelength conversion element 100 is suitable for converting the excitation light beam 10 into a converted beam 20, as shown in FIG. 1B, and the non-wavelength conversion region of the wavelength conversion element 100 is suitable for reflecting the excitation light beam 10, as shown in FIG. 1A. In the present embodiment, the converted beam 20 is a yellow laser beam. The wavelength conversion element 100 outputs the converted beam 20 or/and the excitation light beam 10 as an illumination beam 30. The function of the wavelength conversion element 100 is described in detail in the following embodiments. In the present embodiment, as shown in FIG. 1A, the excitation light beam 10 output by the wavelength conversion element 100 is transmitted to another partial region of the light-splitting element 220A, and a portion of the excitation light beam 10 penetrates the other partial region and is transmitted to the light-splitting element 220B and is successively reflected by the light-splitting element 220B, and another portion of the excitation light beam 10 is directly reflected by the other partial region of the light-splitting element 220A. As shown in FIG. 1B, the converted beam 20 output by the wavelength conversion element 100 is transmitted to the light-splitting element 220A, and then is reflected by the light-splitting element 220A.

As shown in FIG. 1A and FIG. 1B, the projection device 200 further includes a condenser lens 230. The condenser lens 230 is located on the transmission path of the excitation light beam 10 and the converted beam 20 and is disposed between the wavelength conversion element 100 and the light-splitting element 220A. The condenser lens 230 generally refers to a lens with a light condensing function. According to some embodiments, the condenser lens 230 is a convex lens.

As shown in FIG. 1A and FIG. 1B, the projection device 200 further includes a light filter module 240, and the light filter module 240 is located on the transmission path of the excitation light beam 10 and the converted beam 20, and has a light filter optical region (not shown) and a light transmission region (not shown), wherein the light filter module 240 receives the excitation light beam 10 reflected by the light-splitting element 220A and the light-splitting element 220B and the converted beam 20 reflected by the light-splitting element 220A. The projection device 200 further includes, for example, a condenser lens (not labeled) disposed between the light filter module 240 and the light-splitting element 220A to condense the excitation light beam 10 and/or the converted beam 20 and transmit the excitation light beam 10 and/or the converted beam 20 to the light filter module 240. The light filter module 240 is adapted to make the light filter optical region (not shown) correspondingly enter the irradiation range of the converted beam 20 at different times to respectively form red colored light and green colored light. Moreover, a light transmission region (not shown) also correspondingly enters the irradiation range of the laser beam 10 transmitted to the light filter module 240 at a different time to form a blue colored light. As a result, at least one of the laser beam 10 and the converted beam 20 may be converted into the illumination beam 30 having a plurality of different colors in sequence by the light filter module 240.

Moreover, as shown in FIG. 1A and FIG. 1B, in the present embodiment, the projection device 200 further includes a light-homogenizing element 250 located on the transmission path of the illumination beam 30. In the present embodiment, the light-homogenizing element 250 includes an integration rod, but the invention is not limited thereto. More specifically, as shown in FIG. 1A and FIG. 1B, when the illumination beam 30 from the light filter module 240 is transmitted to the light-homogenizing element 250, the light-homogenizing element 250 may homogenize the illumination beam 30 and transmit the illumination beam 30 to the light valve 260.

Next, as shown in FIG. 1A and FIG. 1B, the light valve 260 is located on the transmission path of the illumination beam 30 from the light-homogenizing element 250 to convert the illumination beam 30 into an image beam 40. In the present embodiment, the light valve 260 is, for example, a digital micro-mirror device (DMD) or a liquid-crystal-on-silicon (LCOS) panel. However, in other embodiments, the light valve 260 may also be a transmissive liquid-crystal panel or other light beam modulators.

The projection lens 270 is located on the transmission path of the image beam 40 from the light valve 260 and is adapted to receive the image beam 40 and generate a projection beam 50 to project the projection beam 50 onto a screen (not shown) to form an image. In the present embodiment, the projection lens 270 includes a combination of one or a plurality of optical lenses having a diopter, and the optical lens includes, for example, various combinations of a non-planar lens such as a biconcave lens, a lenticular lens, a convex-concave lens, a convex-concave lens, a plano-convex lens, a plano-concave lens, and the like. The invention does not limit the configuration and the type of the projection lens 270.

Since after the illumination beam 30 is converged on the light valve 260, the light valve 260 converts the illumination beam 30 into the image beam 40 of different colors to be transmitted to the projection lens 270, the image projected by the image beam 40 converted by the light valve 260 may form a color screen.

Figure 2A:
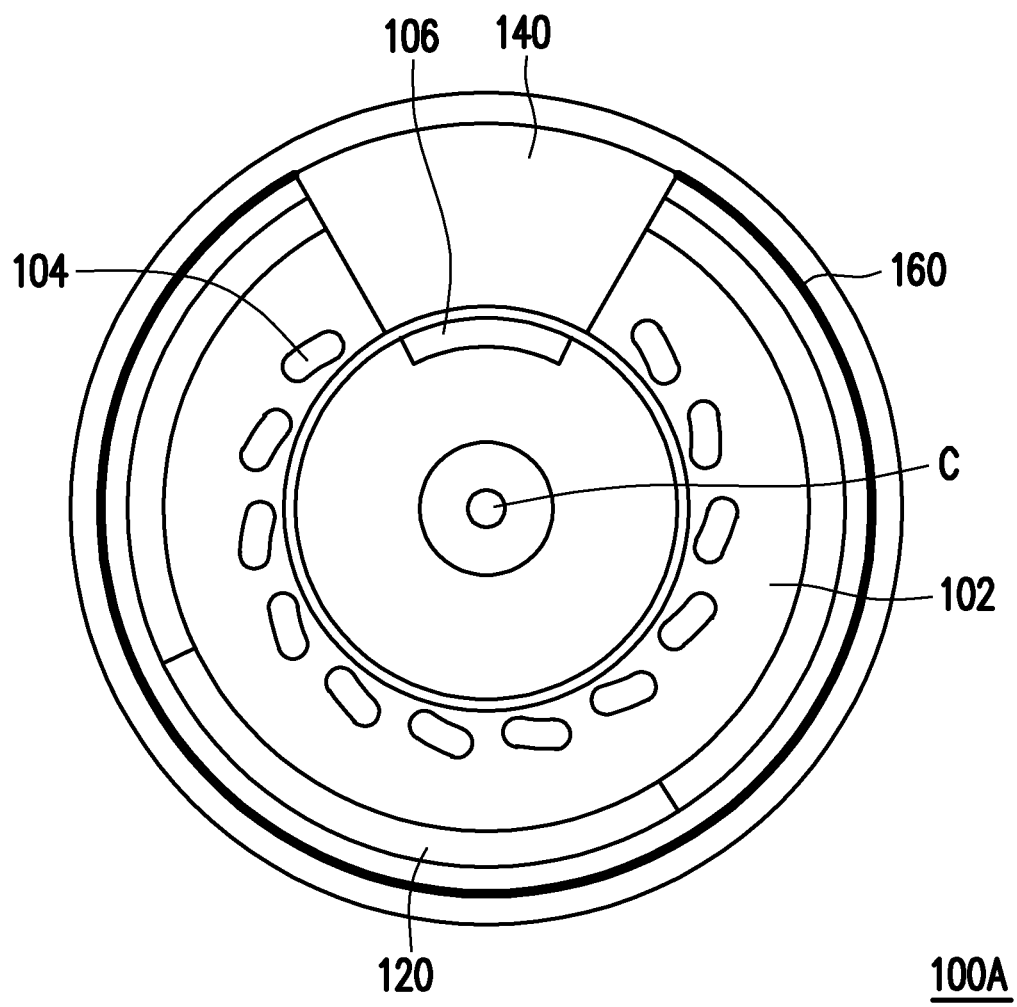
FIG. 2A is a top view of a wavelength conversion element according to an embodiment of the invention.
Figure 2B:
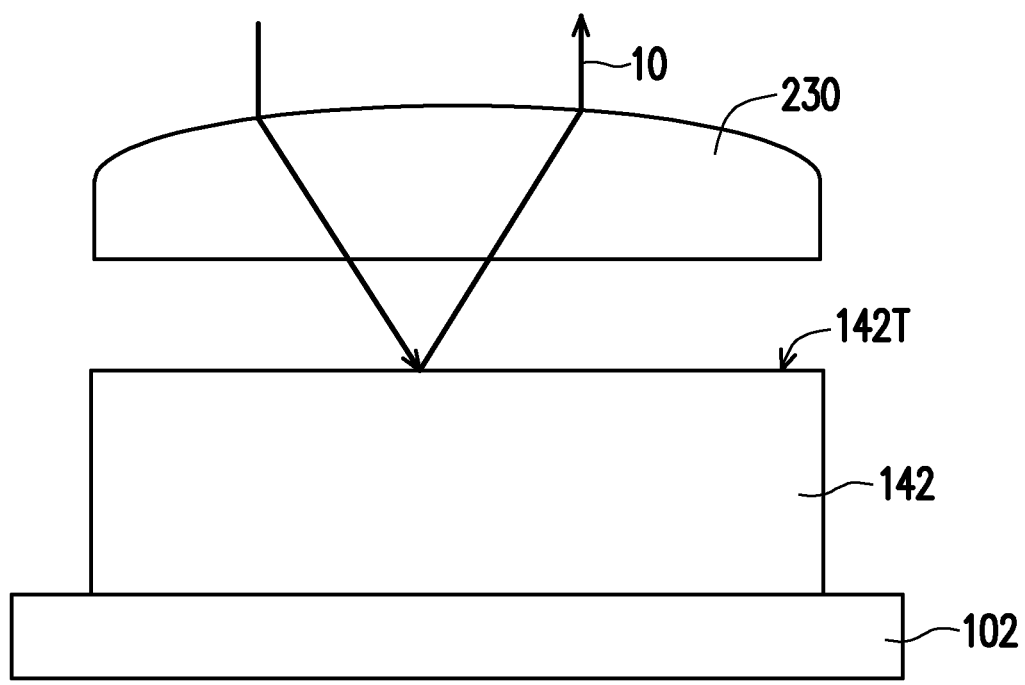
FIG. 2B is a cross-sectional view of a non-wavelength conversion region of a wavelength conversion element according to an embodiment of the invention.
Figure 2C:
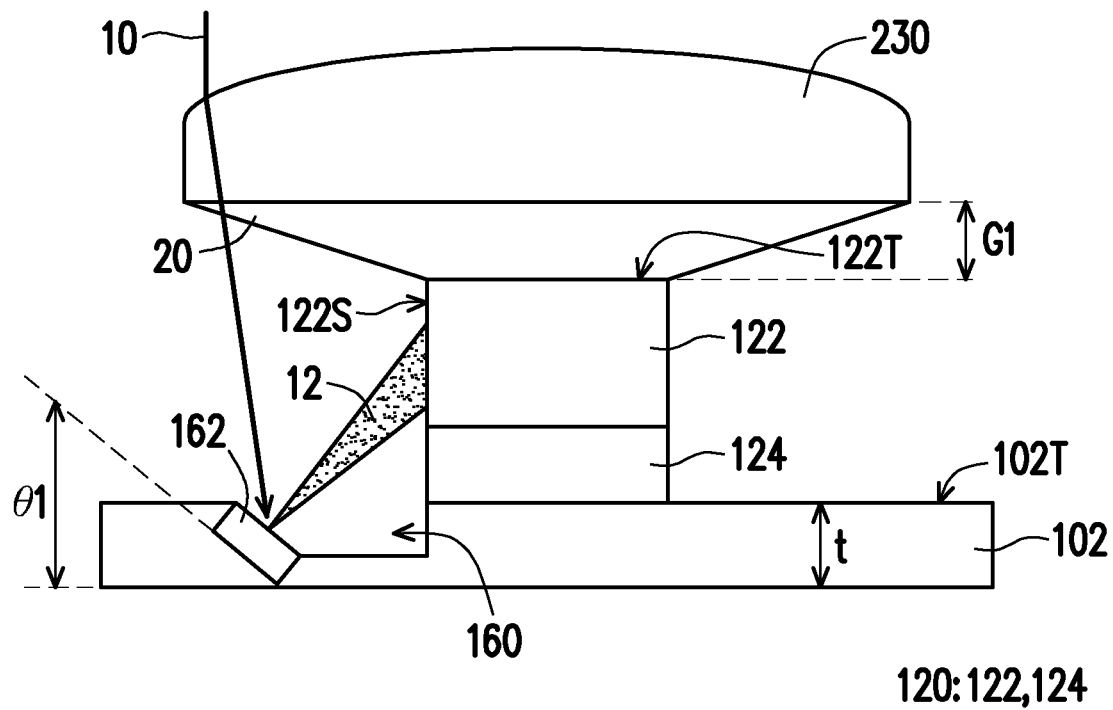
FIG. 2C is a cross-sectional view of a wavelength conversion region of a wavelength conversion element according to an embodiment of the invention.

FIG. 2A is a top view of a wavelength conversion element 100A according to an embodiment of the invention. FIG. 2B is a cross-sectional view of a non-wavelength conversion region of the wavelength conversion element 100A. FIG. 2C is a cross-sectional view of a wavelength conversion region of the wavelength conversion element 100A. Please refer to FIG. 2A, FIG. 2B, and FIG. 2C. According to some embodiments, the wavelength conversion element 100A includes a substrate 102. According to some embodiments, the substrate 102 is a metal substrate. The metal material may effectively reduce the thickness of the substrate 102, and therefore may effectively reduce the weight of the wavelength conversion element 100A, and may also have sufficient strength and is not readily deformed. According to some embodiments, the material of the substrate 102 may be aluminum, aluminum alloy, or other suitable metals, and the invention is not limited thereto.

The substrate 102 has a plurality of stamped heat dissipation bosses 104 and a balance weight material 106. When the excitation light beam 10 is incident on the wavelength conversion element 100A, the temperature of the substrate 102 is increased. When the substrate 102 is rotated at a high speed, the stamped heat dissipation bosses 104 may effectively help the substrate 102 to cool down and maintain the stability of the system. According to some embodiments, the shape and number of the stamped heat dissipation bosses 104 may be configured according to requirements. According to some embodiments, the stamped heat dissipation bosses 104 and the substrate 102 are integrally formed. The balance weight material 106 is disposed at a suitable position on the substrate 102. When the wavelength conversion element 100A is rotated rapidly, the balance weight material 106 may increase the balance and stability of the substrate 102 during rotation.

The substrate 102 further includes a wavelength conversion region 120 and a non-wavelength conversion region 140. The wavelength conversion region 120 and the non-wavelength conversion region 140 are adjacently disposed on the substrate 102 and form a ring shape. The configuration positions of the stamped heat dissipation bosses 104 and the balance weight material 106 on the substrate 102 are not overlapped with the non-wavelength conversion region 140 and the wavelength conversion region 120. When the substrate 102 is rotated about a central axis C, the non-wavelength conversion region 140 and the wavelength conversion region 120 alternately enter a transmission path of the excitation light beam 10. When the wavelength conversion device 100A is in the blue light sequence, the non-wavelength conversion region 140 enters the transmission path of the excitation light beam 10. When the wavelength conversion device 100A is in the yellow light sequence (or the sequence of the converted beam of another color), the wavelength conversion region 120 enters the transmission path of the excitation light beam 10.

As shown in FIG. 2A, the substrate 102 further has a recessed portion 160 thereon. The recessed portion 160 is located on the transmission path of the excitation light beam 10. The recessed portion 160 is located outside the wavelength conversion region 120 in the radial direction and surrounds the wavelength conversion region 120. That is, in the radial direction of the substrate 102, the wavelength conversion region 120 is located between the central axis C and the recessed portion 160. The excitation light beam 10 enters the recessed portion 160 and is reflected by the recessed portion 160 into the wavelength conversion region 120.

As shown in FIG. 1A and FIG. 2B, when the wavelength conversion element 100A is in the blue light sequence, the excitation light beam 10 from the light source 210 is incident on the non-wavelength conversion region 140, and after being reflected by the non-wavelength conversion region 140, is incident on the condenser lens 230, and the condenser lens 230 converges the excitation light beam 10 after reflection, and transmits the excitation light beam 10 to the light-splitting element 220A.

In the present embodiment, the wavelength conversion element 100A includes a reflective layer 142 disposed at the non-wavelength conversion region 140 configured to reflect the excitation light beam 10 incident on an upper surface 142T of the reflective layer 142 of the non-wavelength conversion region 140. According to some embodiments, the reflective layer 142 is a specular reflective element, and the specular reflective element may be blue light reflective glass. According to other embodiments, the material of the reflective layer 142 may be a metal coating, such as silver, aluminum, dielectric coating, etc., with a thickness of less than 5 μm.

When the light source 210 emits the excitation light beam 10, the energy distribution of the light spot of the excitation light beam 10 is a Gaussian distribution, and the shape of the light spot is elliptical. Therefore, when the excitation light beam 10 enters the non-wavelength conversion region 140, that is, the reflective layer 142, the energy distribution of the light spot is a Gaussian distribution, and the shape of the light spot on the reflective layer 142 is elliptical. When the excitation light beam 10 is reflected by the reflective layer 142, the reflective layer 142 does not change the energy distribution and the shape of the light spot of the excitation light beam 10. Therefore, the energy distribution of the light spot of the excitation light beam 10 after reflection is still a Gaussian distribution, as shown in FIG. 2E. The Gaussian distribution has a larger peak power density.

As shown in FIG. 1B and FIG. 2C, when the wavelength conversion element 100A is in the yellow light sequence, the excitation light beam 10 from the light source 210 is incident on the recessed portion 160, is reflected and then incident on the wavelength conversion region 120, and is converted into the converted beam 20 by the wavelength conversion region 120. Then, the converted beam 20 is incident on the condenser lens 230. The condenser lens 230 converges the converted beam 20, and transmits the converted beam 20 to the light-splitting element 220A.

As shown in FIG. 2C, the recessed portion 160 is located on a surface 102T of the substrate 102, and the surface 102T of the substrate 102 is also the light incident surface of the wavelength conversion element 100A. The recessed portion 160 is recessed into the substrate 102 relative to the surface 102T. The recessed portion 160 includes an inclined surface 162. For example, the inclined surface 162 is inclined from the surface 102T of the substrate 102 to the bottom portion of the recessed portion 160. According to some embodiments, the inclined surface 162 and the substrate 102 are integrally formed, and the inclined surface 162 with the required angle and shape may be formed on the substrate 102 in a stamping manner. Therefore, manufacturing cost may be reduced, and the structural strength of the wavelength conversion element 100A may be increased. According to some embodiments, as shown in FIG. 2C, an included angle θ1 between the inclined surface 162 and the surface 102T of the substrate 102 is 30 degrees to 60 degrees.

Figure 2D:
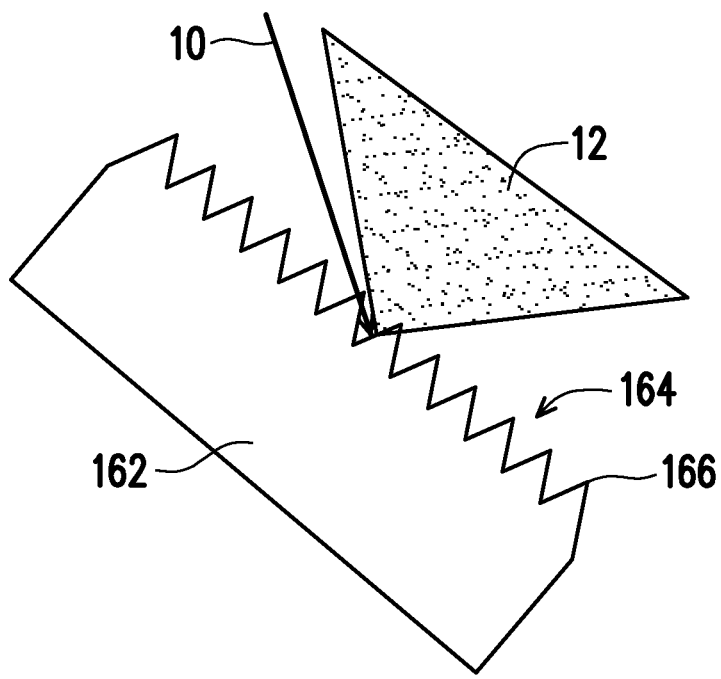
FIG. 2D is a cross-sectional view of a recessed portion of a wavelength conversion element according to an embodiment of the invention.

FIG. 2D is a cross-sectional view of the inclined surface 162 according to an embodiment of the invention. As shown in FIG. 2D, the inclined surface 162 includes a microstructure 164. The microstructure 164 is formed by a plurality of microstructure units 166. According to some embodiments, the size of each of the microstructure units 166 is less than the maximum diameter of the light spot formed by the excitation light beam 10 incident on the inclined surface 162. In this way, the microstructure units 166 of the microstructure 164 change the shape and energy distribution of the light spot of the excitation light beam 10. According to some embodiments, the shape of the microstructure units 166 is rectangular, or other suitable shapes, and the invention is not limited thereto. According to some embodiments, the light spot of the excitation light beam 10 incident on the inclined surface 162 may be an elliptical light spot of 2 mm*1 mm, and the power density distribution thereof is a Gaussian distribution. The excitation light beam 10 becomes an excitation light beam 12 after being reflected by the microstructure 164 of the surface of the inclined surface 162. The excitation light beam 12 has a rectangular light spot of 2 mm*1 mm, and the power density distribution thereof is a plateau distribution, as shown in FIG. 2F. Compared with the Gaussian distribution, the plateau distribution has a smaller and more uniform peak power density. Therefore, the function of the inclined surface 162 is equivalent to a reflective element with a fly-eye function homogenizing the incident excitation light beam 10 and reflecting the homogenized excitation light beam 12.

Returning to FIG. 2C, as shown in FIG. 2C, the wavelength conversion region 120 includes at least one wavelength conversion layer 122 configured to convert the excitation light beam 12 into the converted beam 20, and the recessed portion 160 and the wavelength conversion layer 122 are located on the same side of the substrate 102. According to some embodiments, the wavelength conversion layer 122 may be phosphor or other materials with wavelength conversion ability, and the invention is not limited thereto.

Returning to FIG. 2C, as shown in FIG. 2C, the inclined surface 162 is inclined toward the wavelength conversion layer 122. When the excitation light beam 10 is incident on the inclined surface 162, the microstructure 164 on the inclined surface 162 changes the shape and energy distribution of the light spot of the excitation light beam 10 to form the homogenized excitation light beam 12, and reflects the excitation light beam 12 to be incident on a sidewall 122S of the wavelength conversion layer 122, so that the excitation light beam 12 is incident on the wavelength conversion layer 122 from the sidewall 122S of the wavelength conversion layer 122. According to some embodiments, the shape of the light spot of the excitation light beam 12 is rectangular, and the energy distribution is a plateau distribution, as shown in FIG. 2F.

In more detail, the wavelength conversion layer 122 is located on the surface 102T of the substrate 102. The excitation light beam 10 is reflected by the inclined surface 162 into the homogenized excitation light beam 12, the excitation light beam 12 is incident from the sidewall 122S of the wavelength conversion layer 122 and enters the wavelength conversion layer 122, and the wavelength conversion layer 122 converts the excitation light beam 12 into the converted beam 20. According to some embodiments, the converted beam 20 is a yellow light beam. Since the shape and power density distribution of the light spot of the excitation light beam 12 incident on the wavelength conversion layer 122 are changed by the microstructure 164 of the inclined surface 162, the peak power density of the excitation light beam 12 may be effectively reduced, thus preventing the incident wavelength conversion layer 122 from being burnt or the reduction in the conversion efficiency of the incident wavelength conversion layer 122. According to some embodiments, the area of the sidewall 122S of the wavelength conversion layer 122 is equal to or greater than the area of a top surface 122T of the at least one wavelength conversion layer 122. The larger area of the sidewall 122S helps the excitation light beam 12 enter the wavelength conversion layer 122.

As shown in FIG. 2C, the excitation light beam 12 hits the sidewall 122S of the wavelength conversion layer 122 laterally. Since the sidewall 122S is the outer sidewall of the wavelength conversion layer 122, when the wavelength conversion element 100A is rotated at a high speed, the sidewall 122S of the wavelength conversion layer 122 has a higher linear velocity, so the heat dissipation efficiency of the sidewall 122S of the wavelength conversion layer 122 may be improved.

As shown in FIG. 2C, the wavelength conversion region 120 further includes a reflective layer 124. The reflective layer 124 is located between the wavelength conversion layer 122 and the top surface 102T of the substrate 102. The material of the reflective layer 124 of the wavelength conversion region 120 is a metal film configured to reflect the converted beam 20 converted by the wavelength conversion layer 122 away from the wavelength conversion element 100A. According to some embodiments, the reflective layer 124 of the wavelength conversion region 120 is a metal coating film with a thickness less than 5 μm. According to some embodiments, if the substrate 102 is a highly reflective metal substrate, the reflective layer 124 may be omitted. At this time, the converted beam 20 converted by the wavelength conversion layer 122 is directly reflected by the highly reflective metal surface of the substrate 102 away from the wavelength conversion element 100A.

The converted beam 20 converted by the wavelength conversion layer 122 is reflected by the reflective layer 124 away from the wavelength conversion element 100A to be incident on the condenser lens 230, and the converted beam 20 is converged by the condenser lens 230 and transmitted back to the light-splitting element 220A.

Please return to FIG. 2C. As shown in FIG. 2C, there is a spacing G1 between the condenser lens 230 and the top surface 122T of the wavelength conversion layer 122. The spacing G1 between the condenser lens 230 and the wavelength conversion layer has a significant influence on the brightness of the entire projection device. When the spacing G1 is too small, the condenser lens 230 may affect the operation of the wavelength conversion element 100A. Because the wavelength conversion element 100A is a high-speed rotating element, if the peripheral deflection of the wavelength conversion element 100A is too large and the spacing G1 is too small, the wavelength conversion element 100A and the condenser lens 230 may interfere or collide, resulting in damage to the machine. Therefore, a sufficient spacing G1 should be left between the wavelength conversion element 100A and the condenser lens 230. However, if the spacing G1 is too large, the converted beam 20 generated by the wavelength conversion element 100A may not be entirely collected by the condenser lens 230, resulting in low light condensing efficiency. According to prior art, to solve this issue, a larger condenser lens 230 may be used to increase the light-collecting area, but this further causes the issue of excessive size of the projection device.

The issue may be solved by adjusting the shape and size of the light spot of the converted beam 20 emitted from the wavelength conversion element 100A and changing the incident angle θ1 of the excitation light beam 10 incident on the inclined surface 162. To adjust the shape and size of the light spot of the converted beam 20, the shape and size of the light spot of the outgoing converted beam 20 may be adjusted indirectly by adjusting the shape and size of the light spot of the excitation light beam 10 incident on the wavelength conversion element 100A. With the inclined surface 162 outside the wavelength conversion region 120 of the wavelength conversion element 100A, the excitation light beam 10 from the light source is not directly incident on the wavelength conversion region 120 after passing through the condenser lens 230, but is first reflected by the inclined surface 162 and then enters the wavelength conversion layer 122 of the wavelength conversion region 120. Therefore, only the angle and distance of the inclined surface 120 need to be set according to requirements, and the shape and size of the light spot of the incident wavelength conversion layer 122 may be adjusted without increasing the size of the optical machine. Furthermore, the shape and size of the light spot of the output wavelength conversion element 100A are further adjusted to maximize the efficiency of the incident condenser lens 230. Changing the incident angle θ1 of the excitation light beam 10 incident on the inclined surface 162 may change the position where the converted beam 20 enters the condenser lens 230, thereby changing the spacing G1.

According to some embodiments, the preferred range of the spacing G1 is 1 to 3 times a thickness t of the substrate 102. Here, the thickness t of the substrate 102 is the distance between the surface 102T and the opposite surface thereof of the substrate 102 in a direction parallel to the central axis C. According to some embodiments, if the substrate t=0.7 mm, the preferred range of the spacing G1 is 0.7 mm to 2.1 mm. Within this range, the condenser lens 230 may have better light condensing efficiency.

As shown in the wavelength conversion element 100A shown in FIG. 2A, FIG. 2B, and FIG. 2C, since the inclined surface 162 is equivalent to a reflective lens with fly-eye function, the energy density distribution of the excitation light beam 10 may be converted from a Gaussian distribution to a plateau distribution. Therefore, the fly-eye element in the common optical path may be omitted, the optical path may be shortened, the system may be effectively simplified, the energy density may be effectively reduced to avoid burning the wavelength conversion layer, and wavelength conversion efficiency may be increased.

Figure 3A:
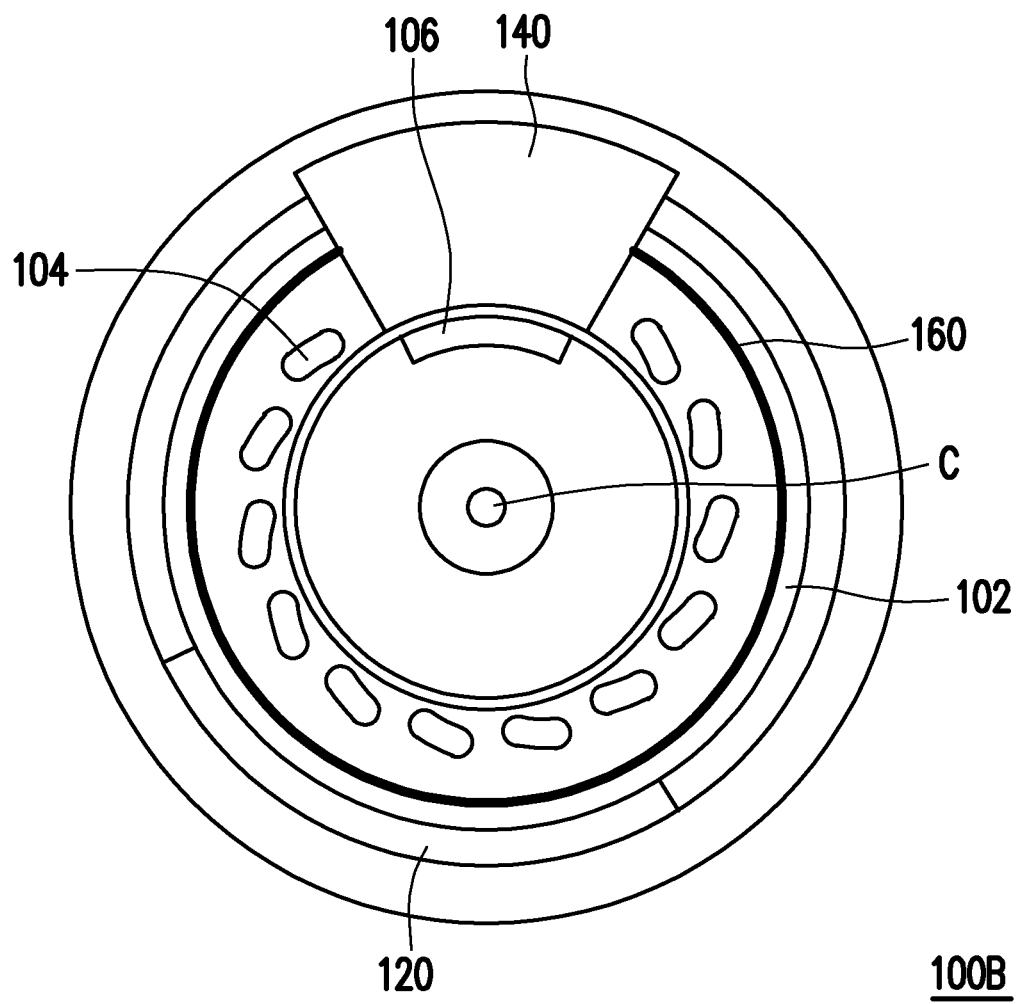
FIG. 3A is a top view of a wavelength conversion element according to another embodiment of the invention.
Figure 3B:
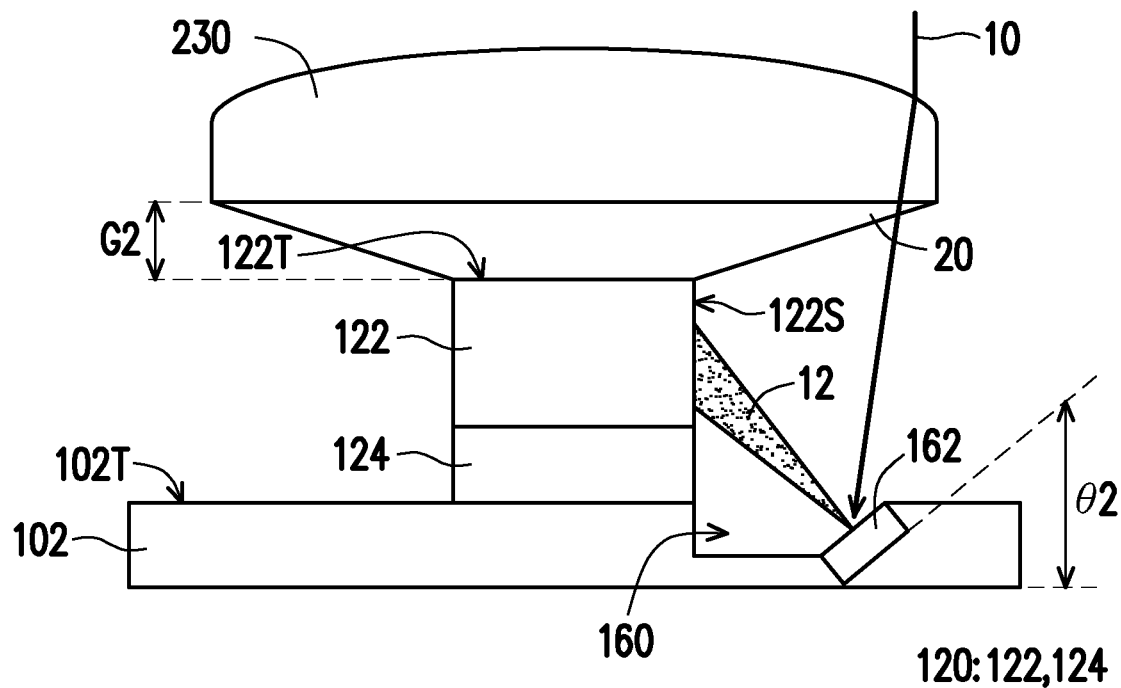
FIG. 3B is a cross-sectional view of a wavelength conversion region of a wavelength conversion element according to another embodiment of the invention.
Figure 3C:
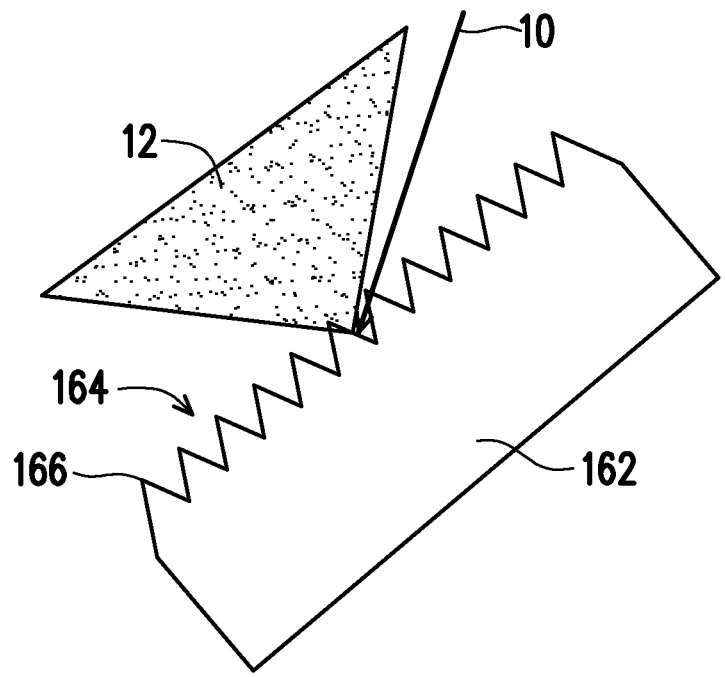
FIG. 3C is a cross-sectional view of a recessed portion of a wavelength conversion element according to another embodiment of the invention.

FIG. 3A is a top view of a wavelength conversion element 100B according to another embodiment of the invention. FIG. 3B is a cross-sectional view of a wavelength conversion region of the wavelength conversion element 100B. FIG. 3C is a cross-sectional view of a recessed portion of the wavelength conversion element 100B. The wavelength conversion element 100B of FIG. 3A and the wavelength conversion element 100A of FIG. 2A have a similar structure, so only the differences are discussed.

As shown in FIG. 3A, FIG. 3B, and FIG. 3C, the recessed portion 160 of the wavelength conversion element 100B is located inside the wavelength conversion region 120 in the radial direction and surrounds the wavelength conversion region 120. That is, in the radial direction, the recessed portion 160 is located between the central axis C and the wavelength conversion region 120. In particular, the inclined surface 162 of the recessed portion 160 is provided with the microstructure 164 configured to adjust an incident angle θ2 of the excitation light beam 10, and is used as a homogenizing element when the wavelength conversion element 100B is in the yellow light sequence. In addition, the recessed portion 160 is only provided corresponding to the wavelength conversion region 120, and is not provided corresponding to the non-wavelength conversion region 140. That is, the non-wavelength conversion region 140 is not provided with the recessed portion 160. The wavelength conversion element 100B of FIG. 3A has the same characteristics and advantages as the wavelength conversion element 100A of FIG. 2A. However, the recessed portion 160 is located on the inner side of the wavelength conversion region 120 in the radial direction. When the wavelength conversion element 100B is rotated at a high speed, the linear velocity of the inner sidewall 122S of the wavelength conversion layer 122 on which the excitation light beam 12 is incident is lower than the outer sidewall of the wavelength conversion layer 122. Therefore, the heat dissipation effect of the wavelength conversion element 100B is slightly lower than that of the wavelength conversion element 100A.

In the wavelength conversion element 100B, there is a spacing G2 between the condenser lens 230 and the top surface 122T of the wavelength conversion layer 122. By changing the incident angle θ2 of the excitation light beam 10 incident on the inclined surface 162, the spacing G2 between the condenser lens 230 and the top surface of the wavelength conversion layer 122 may be optimized, so that the condenser lens 230 may maximize the light-receiving area and light-receiving efficiency of the converted beam 20.

Figure 4A:
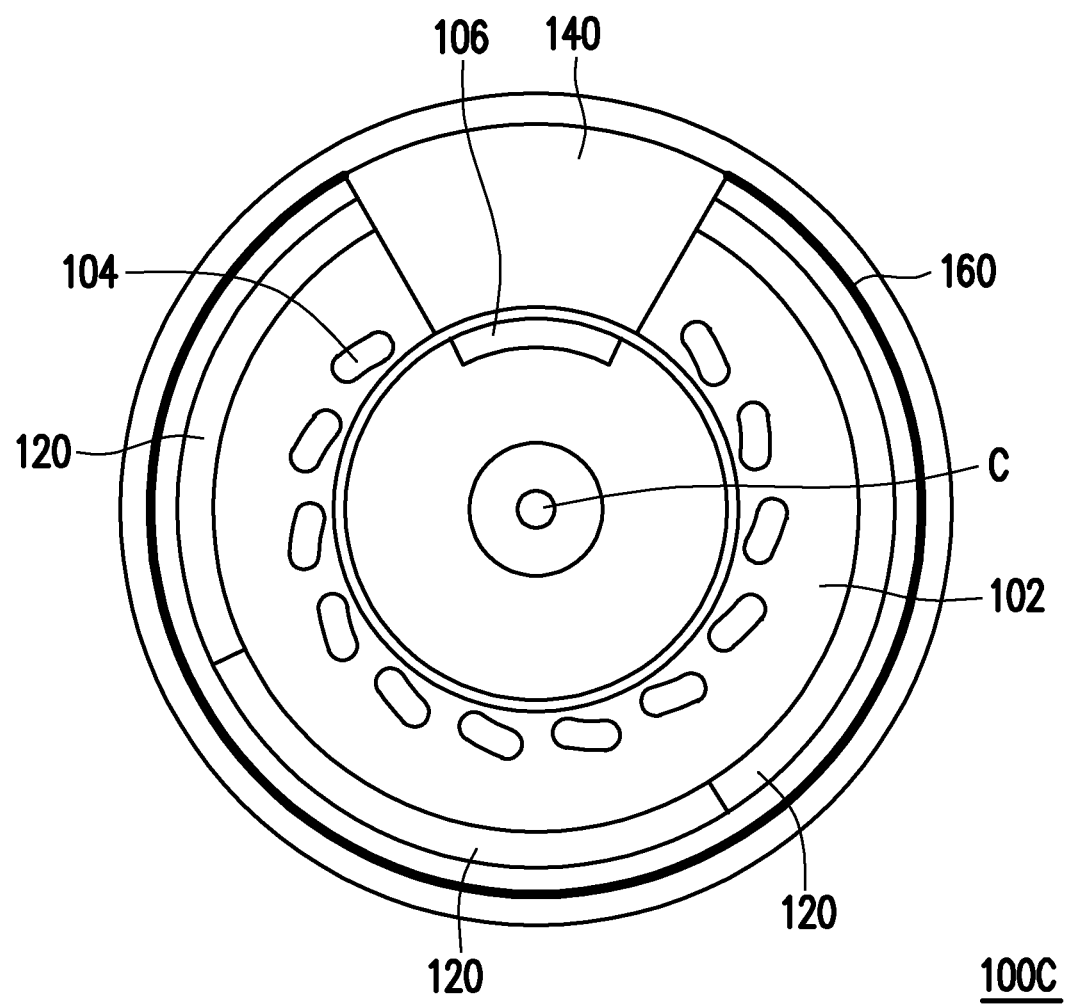
FIG. 4A is a top view of a wavelength conversion element according to another embodiment of the invention.
Figure 4B:
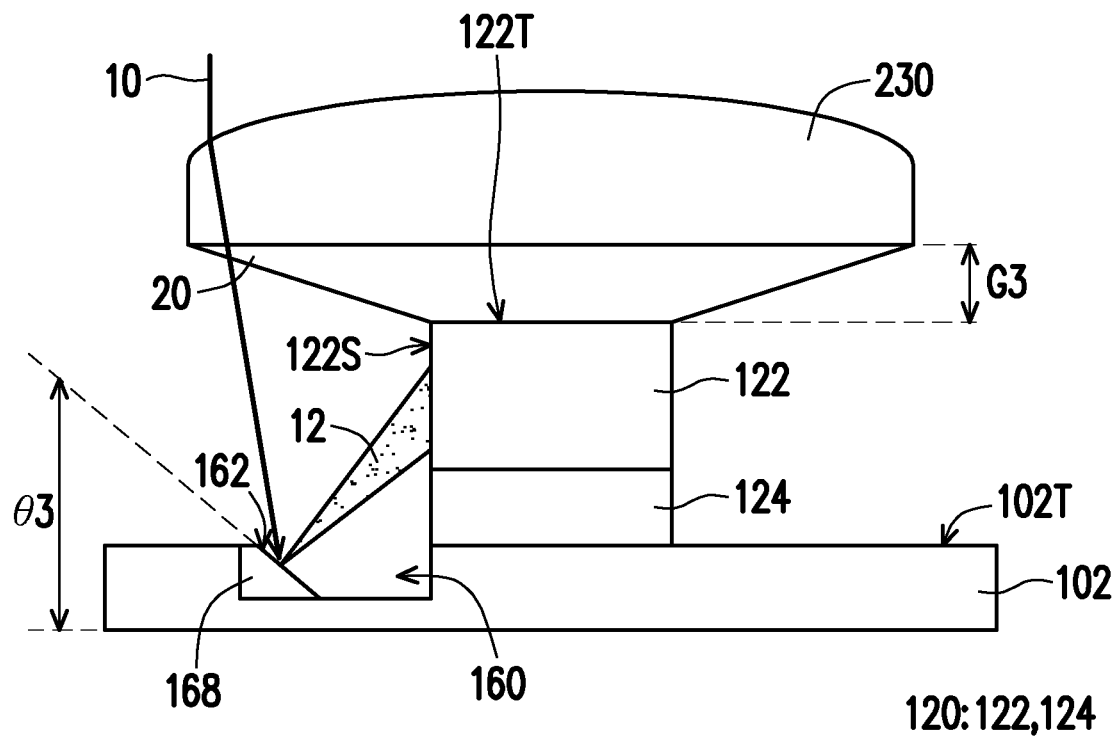
FIG. 4B is a cross-sectional view of a wavelength conversion region of a wavelength conversion element according to another embodiment of the invention.
Figure 4C:
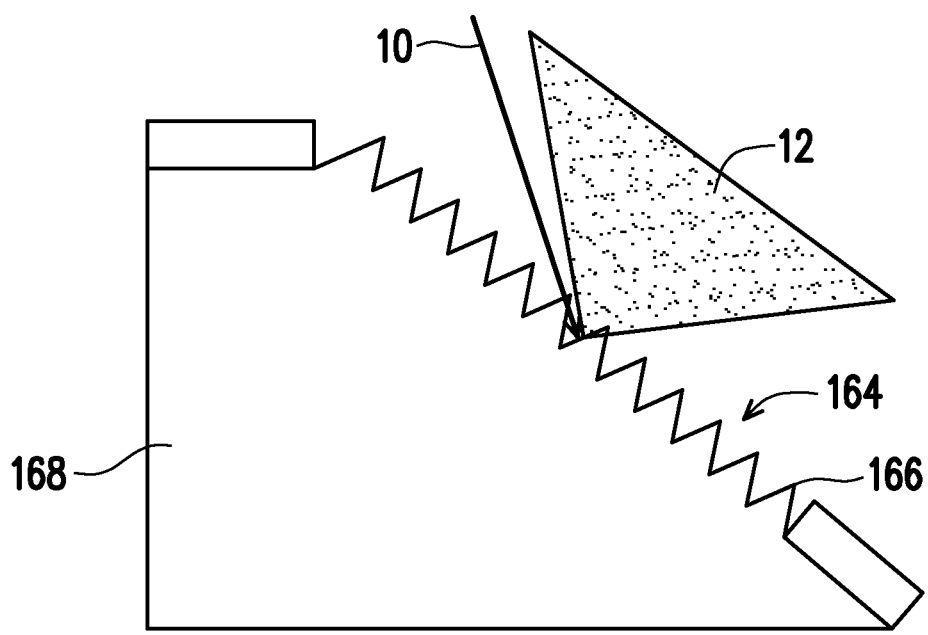
FIG. 4C is a cross-sectional view of a recessed portion of a wavelength conversion element according to another embodiment of the invention.

FIG. 4A is a top view of a wavelength conversion element 100C according to another embodiment of the invention. FIG. 4B is a cross-sectional view of a wavelength conversion region of the wavelength conversion element 100C. FIG. 4C is a cross-sectional view of the recessed portion of the wavelength conversion element 100C. The wavelength conversion element 100C of FIG. 4A and the wavelength conversion element 100A of FIG. 2A have a similar structure, so only the differences are discussed.

As shown in FIG. 4A, FIG. 4B, and FIG. 4C, the inclined surface 162 of the recessed portion 160 of the wavelength conversion element 100C is an optical element 168 with reflective characteristics. The optical element 168 includes the microstructure 164. The microstructure 164 is formed by the plurality of microstructure units 166. Here, the microstructure 164 of the optical element 168 and the microstructure 164 of the inclined surface 162 in FIG. 2D have similar functions, which are not repeated herein. The optical element 168 is fixed in the recessed portion 160 of the substrate 102, and the optical element 168 is, for example, configured to be inclined from the surface 102T of the substrate 102 to the bottom portion of the recessed portion 160. According to some embodiments, the optical element 168 is attached inside the recessed portion 160 of the substrate 102 using a high thermal conductivity adhesive (not shown). According to some embodiments, the material of the optical element 168 may be microstructured glass, microstructured metal material, molded microstructured composite material, or other suitable materials, and the invention is not limited thereto. Since the optical element 168 and the substrate 102 are not integrally formed, and the optical element 168 is an independent element, the structure of the optical element 168 may be formed in a variety of ways, and the required microstructure may be changed arbitrarily, which is not limited by the stamping process of the substrate 102. Compared with the wavelength conversion element 100A, an attaching process needs to be added during the manufacturing process of the wavelength conversion element 100C to attach the optical element 168 inside the recessed portion 160 of the substrate 102.

In the wavelength conversion element 100C, there is a spacing G3 between the condenser lens 230 and the top surface 122T of the wavelength conversion layer 122. By changing an incident angle θ3 of the excitation light beam 100 incident on the optical element 168, the spacing G3 between the condenser lens 230 and the top surface 122T of the wavelength conversion layer 122 may be optimized, so that the condenser lens 230 may maximize the light-receiving area and light-receiving efficiency of the converted beam 20.

Figure 5A:
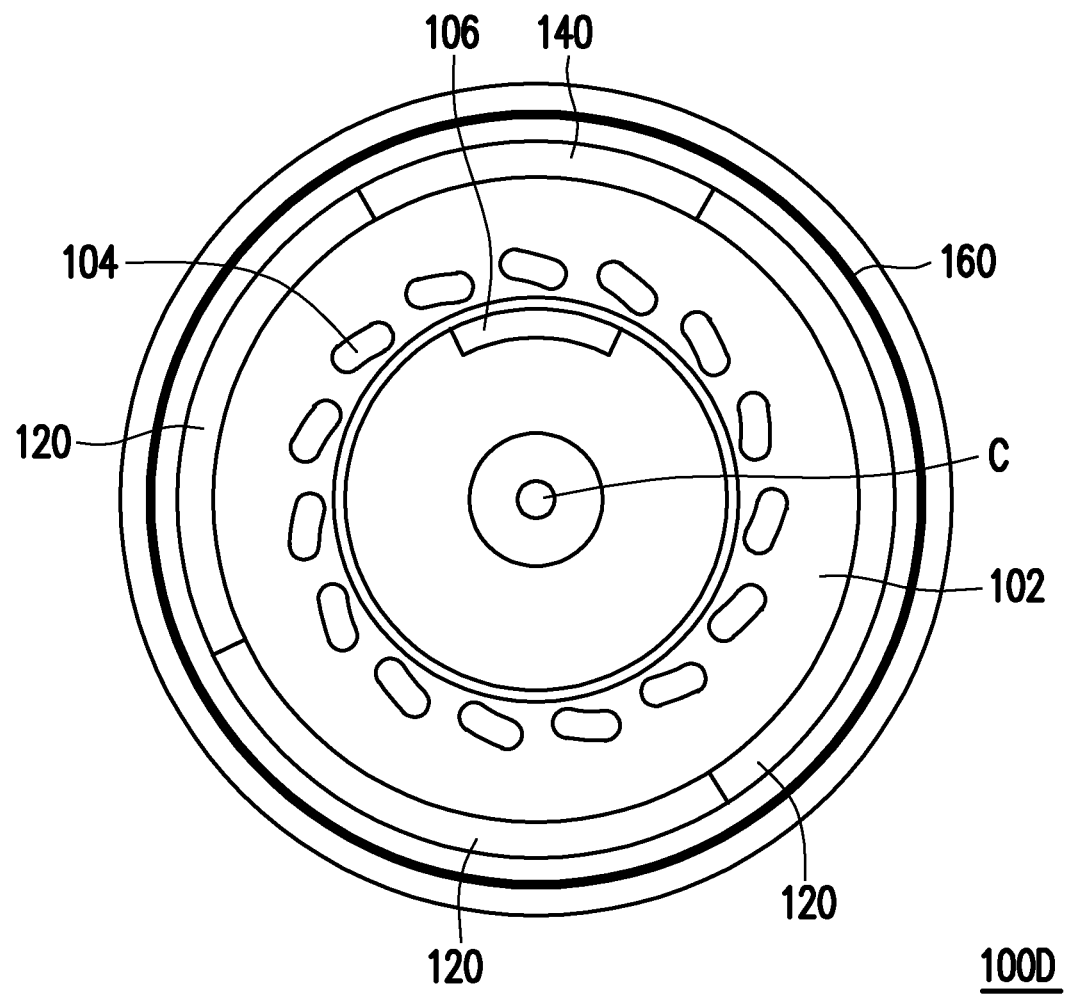
FIG. 5A is a top view of a wavelength conversion element according to another embodiment of the invention.
Figure 5B:
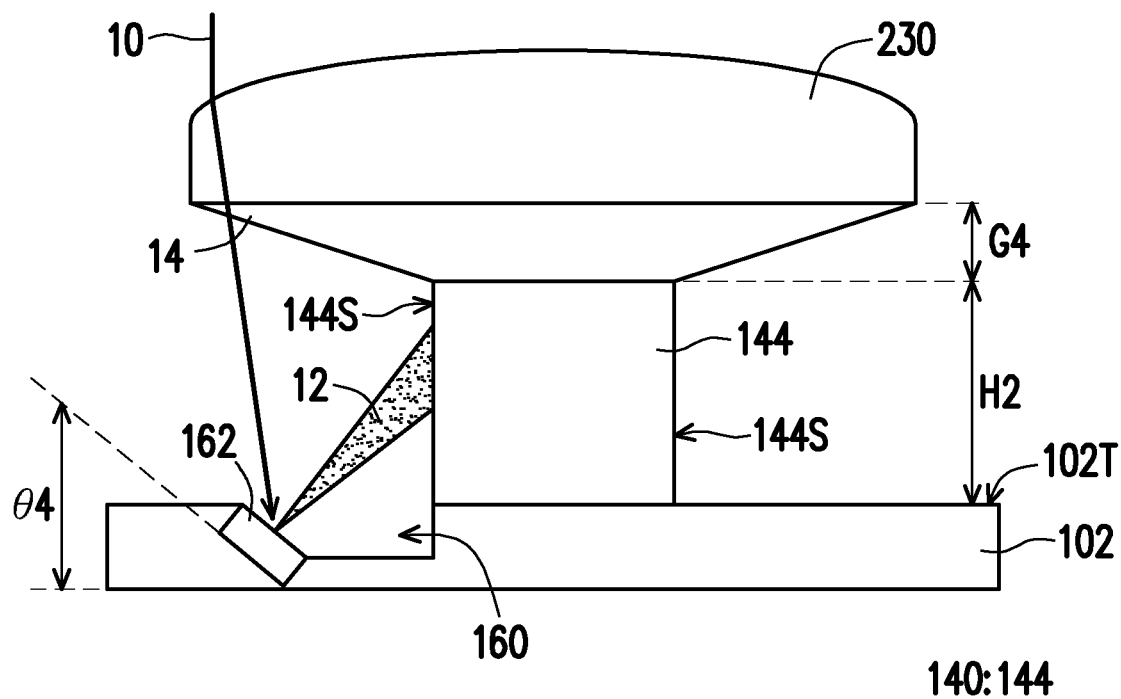
FIG. 5B is a cross-sectional view of a non-wavelength conversion region of a wavelength conversion element according to another embodiment of the invention.
Figure 5C:
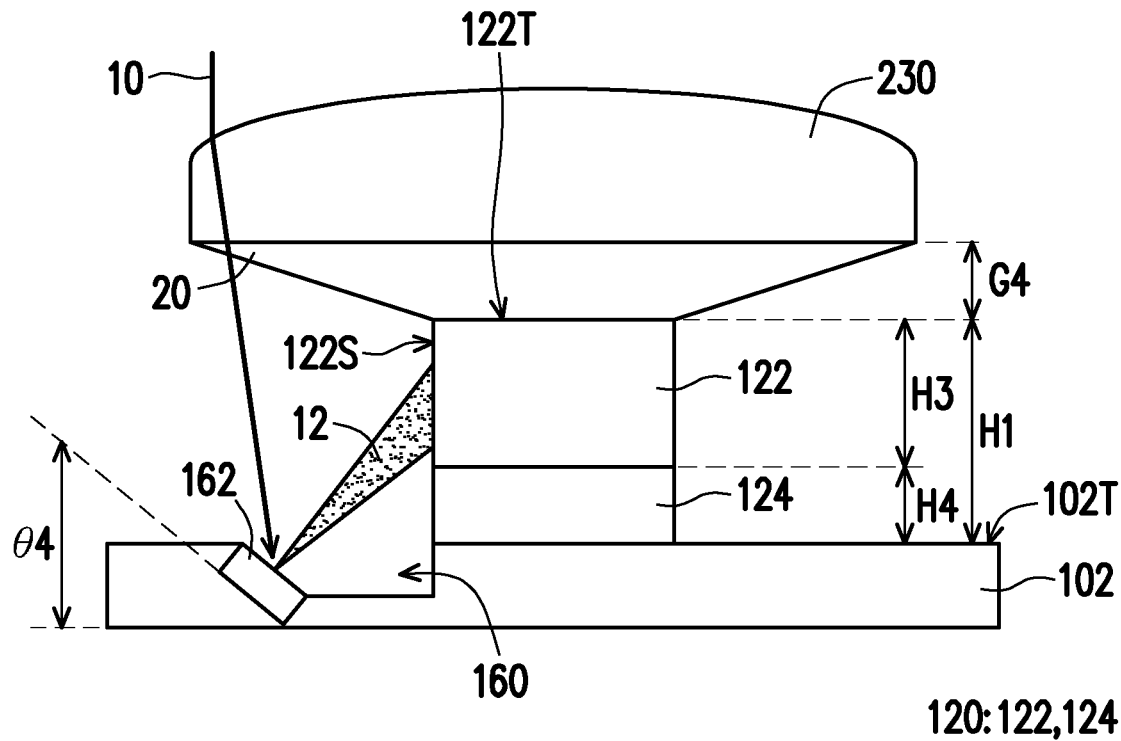
FIG. 5C is a cross-sectional view of a wavelength conversion region of a wavelength conversion element according to another embodiment of the invention.

FIG. 5A is a top view of another wavelength conversion element 100D according to an embodiment of the invention. FIG. 5B is a cross-sectional view of a non-wavelength conversion region of the wavelength conversion element 100D. FIG. 5C is a cross-sectional view of a wavelength conversion region of the wavelength conversion element 100D. Please refer to FIG. 5A, FIG. 5B, and FIG. 5C at the same time. The wavelength conversion element 100D of FIG. 5A and the wavelength conversion element 100A of FIG. 2A have a similar structure, so only the differences are discussed.

In the wavelength conversion element 100D, the non-wavelength conversion region 140 is provided with a reflective layer 144, and the reflective layer 144 is a scattering reflective layer 144. In other words, in the wavelength conversion element 100D, the reflective layer 142 of the non-wavelength conversion region in the wavelength conversion element 100A is replaced with the scattering reflective layer 144. In this way, the cost of the blue reflective glass may be reduced, and there is no need to additionally remove the fan-shaped portion of the substrate 102 corresponding to the blue reflective glass when the substrate 102 is stamped. Therefore, the structural strength of the wavelength conversion element 100D may be improved. According to some embodiments, the material of the scattering reflective layer 144 of the non-wavelength conversion region 140 includes adhesive and metal oxide, wherein the metal oxide includes aluminum oxide or titanium dioxide, or other scattering/reflective materials with similar characteristics, and the invention is not limited thereto. According to some embodiments, the thickness of the scattering reflective layer 144 is 0.05 mm to 0.2 mm.

In addition, the inclined surface 162 of the recessed portion 160 not only surrounds the wavelength conversion region 120 but is also extended around the non-wavelength conversion region 140. Therefore, the recessed portion 160 forms a complete ring on the substrate 102 and surrounds the wavelength conversion region 120 and the non-wavelength conversion region 140. In the blue light sequence, as shown in FIG. 5B, the excitation light beam 10 is incident on the inclined surface 162, and the microstructure 164 on the inclined surface 162 changes the shape and energy distribution of the light spot of the excitation light beam 10 to form the homogenized excitation light beam 12. The inclined surface 162 reflects the excitation light beam 12 to the sidewall 144S of the scattering reflective layer 144 of the non-wavelength conversion region 140. When the excitation light beam 12 enters the scattering reflective layer 144 from the sidewall 144S of the scattering reflective layer 144, after being reflected by the scattering reflective layer 144, the excitation light beam 12 leaves the wavelength conversion element 100D in the form of an excitation light beam 14 and is incident on the condenser lens 230, and the condenser lens 230 converges the excitation light beam 14, and transmits the excitation light beam 14 to the light-splitting element 220A.

When the excitation light beam 10 is incident on the inclined surface 162, the microstructure 164 on the inclined surface 162 changes the shape and energy distribution of the light spot of the excitation light beam 10, and converts the energy distribution of the excitation light beam 10 from a Gaussian distribution to the plateau distribution of the excitation light beam 12. When the excitation light beam 12 enters the scattering reflective layer 144 from the sidewall 144S, the scattering reflective layer 144 does not change the shape and energy distribution of the light spot of the excitation light beam 12. Therefore, the excitation light beam 14 emitted by the scattering reflective layer 144 has the same shape and energy distribution of the light spot as the excitation light beam 12. That is, the energy distribution of the light spot of the excitation light beam 14 is a plateau distribution, as shown in FIG. 5D.

As shown in FIG. 5B and FIG. 5C, the height of the non-wavelength conversion area 140 is such that the scattering reflective layer 144 has a height H2. According to some embodiments, the height H2 of the scattering reflective layer 144 may be arbitrarily adjusted by coating. A height H1 of the wavelength conversion region 120 is the sum of a height H3 of the wavelength conversion layer 122 and a height H4 of the reflective layer 124. Since the height H3 of the wavelength conversion layer 122 (on the order of mm) is generally much larger than the height H4 (on the order of μm) of the reflective layer 124, the height H1 of the wavelength conversion region 120 and the height H3 of the wavelength conversion layer 122 are substantially equal. According to some embodiments, when the height H2 of the scattering reflective layer 144 of the non-wavelength conversion region 140 is substantially equal to the height H3 of the wavelength conversion layer 122, a better conversion efficiency may be obtained. According to some embodiments, the height ratio of the scattering reflective layer 144 to the wavelength conversion layer 122 is 0.95 to 1.05.

Moreover, in the blue light sequence and in the yellow light sequence, the excitation light beam 10 is incident on the inclined surface 162 having the microstructure 164 in both cases, and the microstructure 164 on the inclined surface 162 makes the energy distribution of the light spot of the excitation light beam 12 a plateau distribution. Therefore, the excitation light beam 12 incident on the scattering reflective layer 144 is the same as the excitation light beam 12 incident on the wavelength conversion layer 122, and the energy density distribution is a plateau distribution in both cases, as shown in FIG. 5D and FIG. 5E.

Therefore, in the wavelength conversion element 100D, in the blue light sequence, the excitation light beam 10 is first incident on the microstructure 164 of the inclined surface 162 so that the energy distribution of the excitation light beam 12 after reflection is a plateau distribution, and then the excitation light beam 12 is incident on the scattering reflective layer 144. Therefore, the energy distribution of the excitation light beam 14 reflected by the scattering reflective layer 144 is a plateau distribution. In the yellow light sequence, the excitation light beam 10 is first incident on the microstructure 164 of the inclined surface 162 so that the energy distribution of the excitation light beam 12 after reflection is a plateau distribution, and then the excitation light beam 12 is incident on the wavelength conversion layer 12. Therefore, the energy distribution of the converted beam 20 generated by the wavelength conversion layer 12 is also a plateau distribution.

In the wavelength conversion element 100D, there is a spacing G4 between the condenser lens 230 and the top surface 122T of the wavelength conversion layer 122. By changing an incident angle θ4 of the excitation light beam 100 incident on the inclined surface 162, the spacing G4 between the condenser lens 230 and the upper surface of the wavelength conversion layer 122 may be optimized, so that the condenser lens 230 may maximize the light-receiving area and light-receiving efficiency of the converted beam 20.

Figure 6A:
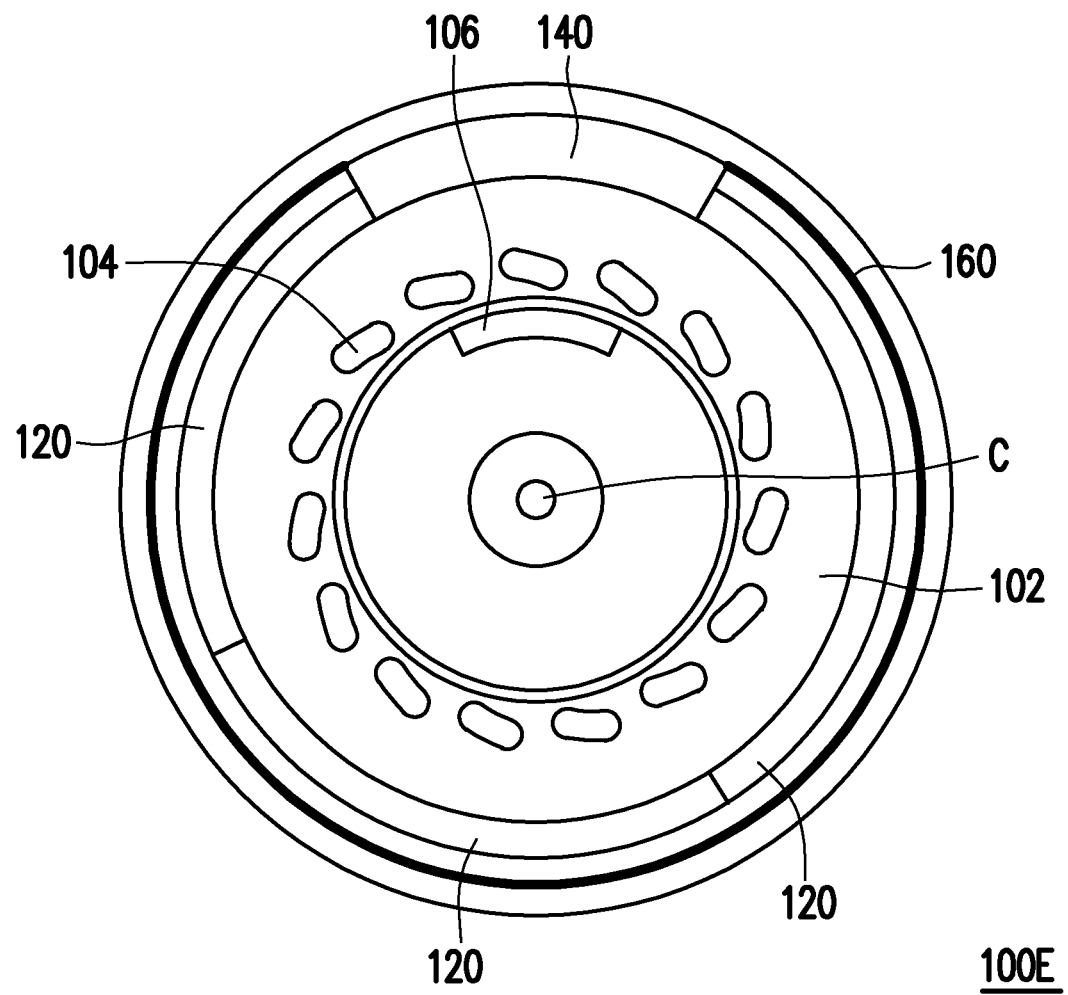
FIG. 6A is a top view of a wavelength conversion element according to another embodiment of the invention.
Figure 6B:
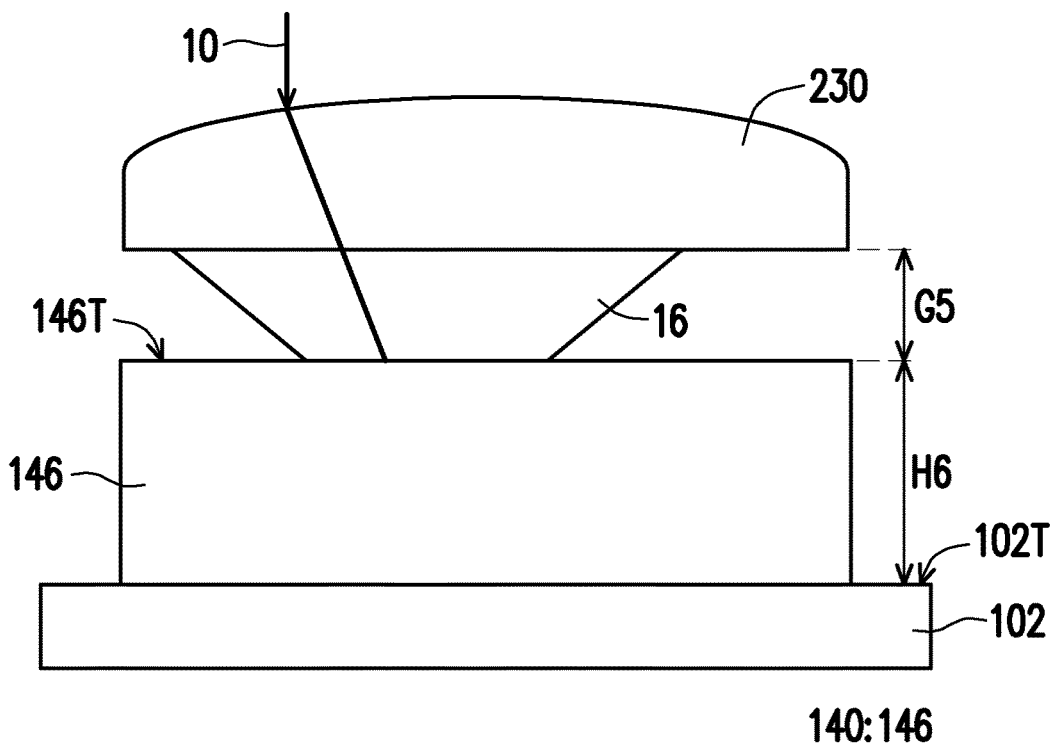
FIG. 6B is a cross-sectional view of a non-wavelength conversion region of a wavelength conversion element according to another embodiment of the invention.
Figure 6C:
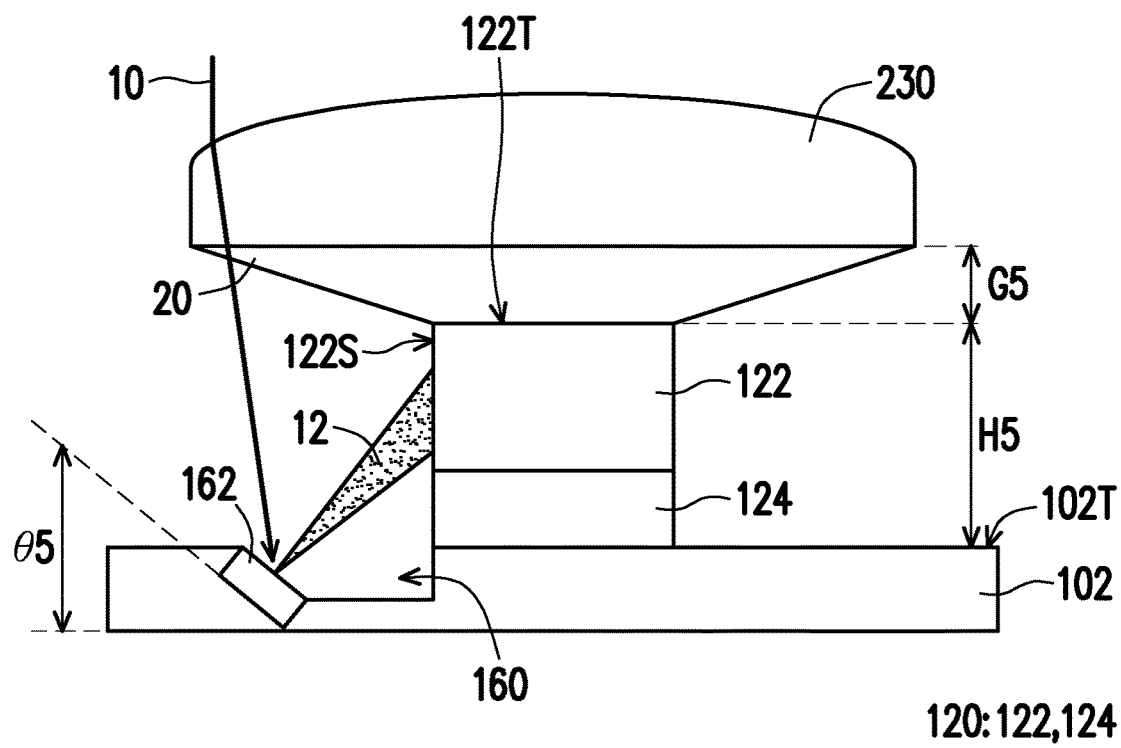
FIG. 6C is a cross-sectional view of a wavelength conversion region of a wavelength conversion element according to another embodiment of the invention.

FIG. 6A is a top view of a wavelength conversion element 100E according to another embodiment of the invention. FIG. 6B is a cross-sectional view of a non-wavelength conversion area of the wavelength conversion element 100E. FIG. 6C is a cross-sectional view of a wavelength conversion area of the wavelength conversion element 100E. Please refer to FIG. 6A, FIG. 6B, and FIG. 6C at the same time. The wavelength conversion element 100E of FIG. 6A and the wavelength conversion element 100D of FIG. 5A have a similar structure, so only the differences are discussed.

As shown in FIG. 6A and FIG. 6B, the recessed portion 160 only surrounds the wavelength conversion region 120 and does not surround the non-wavelength conversion region 140. The reflective layer of the non-wavelength conversion region 140 is a scattering reflective layer 146 configured to reflect the excitation light beam 10 incident on an upper surface 146T of the scattering reflective layer 146. The difference from FIG. 5A is that the coating area of the scattering reflective layer 146 in the non-wavelength conversion region 140 in FIG. 6A is larger, so that the excitation light beam 10 passing through the condenser lens 230 may directly hit the scattering reflective layer 146. Therefore, when the energy density of the excitation light beam 10 is less, the excitation light beam 10 may be directly incident on the scattering reflective layer 146 without hitting the inclined surface 162 having the microstructure 164 and then being incident on the scattering reflective layer 146.

Therefore, in the wavelength conversion element 100E, in the blue light sequence, the excitation light beam 10 is directly incident on the upper surface 146T of the scattering reflective layer 146, and the energy distribution of the excitation light beam 16 reflected by the scattering reflective layer 146 is a Gaussian distribution. In the yellow light sequence, the excitation light beam 10 first hits the microstructure 164 of the inclined surface 162 of the recessed portion 160 to make the energy distribution of the excitation light beam 12 a plateau distribution, and then is incident on the wavelength conversion layer 12 from the sidewall 122S. Therefore, the energy distribution of the converted beam 20 generated by the wavelength conversion layer 12 is also a plateau distribution.

Moreover, when a height H6 of the scattering reflective layer 146 of the non-wavelength conversion region 140 is substantially equal to the height H2 of the wavelength conversion layer 122, a better conversion efficiency may be obtained. According to some embodiments, the height ratio of the scattering reflective layer 146 to the wavelength conversion layer 122 is 0.95 to 1.05.

In the wavelength conversion element 100E, there is a spacing G5 between the condenser lens 230 and the upper surface 122T of the wavelength conversion layer 122. By changing an incident angle θ5 of the excitation light beam 100 incident on the inclined surface 162, the spacing G5 between the condenser lens 230 and the upper surface of the wavelength conversion layer 122 may be optimized, so that the condenser lens 230 may maximize the light-receiving area and light-receiving efficiency of the converted beam 20.

Based on the above, in the invention, the substrate of the wavelength conversion element has a homogenizing function and the incident angle of the excitation light beam may be changed. Therefore, peak power density may be effectively reduced to avoid burnout and increase the conversion efficiency of the phosphor layer.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. A wavelength conversion element configured to receive an excitation light beam, wherein the wavelength conversion element comprises: a substrate and at least one wavelength conversion layer; wherein,
the substrate is configured to rotate about a central axis, the substrate comprises a wavelength conversion region and a non-wavelength conversion region, and the wavelength conversion region and the non-wavelength conversion region are adjacently disposed on the substrate and form a ring shape, wherein when the substrate is rotated about the central axis, the non-wavelength conversion region and the wavelength conversion region alternately enter a transmission path of the excitation light beam; and
the substrate has a recessed portion, the recessed portion is located inside or outside the wavelength conversion region, and surrounds the wavelength conversion region, the recessed portion and the at least one wavelength conversion layer are located on a surface of the substrate, the recessed portion is recessed into the substrate relative to the surface, and the recessed portion comprises an inclined surface;
wherein when the excitation light beam is incident on the inclined surface, the inclined surface reflects the excitation light beam to the at least one wavelength conversion layer, when the excitation light beam is incident on the at least one wavelength conversion layer, the at least one wavelength conversion layer converts the excitation light beam into a converted beam, and when the excitation light beam is incident on the non-wavelength conversion region, the non-wavelength conversion region reflects the excitation light beam.

2. The wavelength conversion element of claim 1, wherein the inclined surface comprises a microstructure, the microstructure is formed by a plurality of microstructure units, and a size of the plurality of microstructure units is less than a maximum diameter of a light spot formed by the excitation light beam incident on the inclined surface.

3. The wavelength conversion element of claim 2, wherein a shape of the plurality of microstructure units is rectangular.

4. The wavelength conversion element of claim 1, wherein the inclined surface faces the at least one wavelength conversion layer and reflects the excitation light beam onto a sidewall of the at least one wavelength conversion layer, and enters the at least one wavelength conversion layer from the sidewall.

5. The wavelength conversion element of claim 1, wherein the inclined surface comprises a microstructure, and when the excitation light beam is incident on the inclined surface, an energy distribution of a light spot of the excitation light beam is a Gaussian distribution, and after the excitation light beam is reflected by the inclined surface, the energy distribution of the light spot of the excitation light beam is a plateau distribution.

6. The wavelength conversion element of claim 3, wherein when the excitation light beam is incident on the inclined surface, a shape of a light spot of the excitation light beam is elliptical, and after the excitation light beam is reflected by the inclined surface, the shape of the light spot of the excitation light beam is rectangular.

7. The wavelength conversion element of claim 1, wherein the substrate is a metal substrate, and the inclined surface and the substrate are integrally formed.

8. The wavelength conversion element of claim 1, wherein the inclined surface is an optical element with reflective characteristics, the inclined surface comprises a microstructure, and the optical element is fixed in the recessed portion of the substrate.

9. The wavelength conversion element of claim 1, wherein an included angle between the inclined surface and the surface of the substrate is 30 degrees to 60 degrees.

10. The wavelength conversion element of claim 1, wherein an area of a sidewall of the at least one wavelength conversion layer is equal to or greater than an area of a top surface of the at least one wavelength conversion layer.

11. The wavelength conversion element of claim 1, wherein the non-wavelength conversion region is provided with a reflective layer, and the reflective layer is a specular reflective element configured to reflect the excitation light beam incident on an upper surface of the specular reflective element.

12. The wavelength conversion element of claim 1, wherein the non-wavelength conversion region is provided with a reflective layer, and the reflective layer is a scattering reflective layer, wherein the inclined surface of the recessed portion surrounds the non-wavelength conversion region, and the recessed portion forms a complete ring shape on the substrate, wherein the inclined surface reflects the excitation light beam to a sidewall of the scattering reflective layer in the non-wavelength conversion region.

13. The wavelength conversion element of claim 12, wherein a height of the scattering reflective layer of the non-wavelength conversion region is substantially the same as a height of the wavelength conversion region; and
wherein the wavelength conversion region is provided with a reflective layer, and the reflective layer is located between the at least one wavelength conversion layer and the substrate, wherein the height of the wavelength conversion region is a sum of a height of the at least one wavelength conversion layer of the wavelength conversion region and a height of the reflective layer of the wavelength conversion region.

14. The wavelength conversion element of claim 12, wherein a height ratio of the scattering reflective layer to the at least one wavelength conversion layer is 0.95 to 1.05.

15. The wavelength conversion element of claim 12, wherein a material of the scattering reflective layer of the non-wavelength conversion region comprises an adhesive and a metal oxide, wherein the metal oxide comprises aluminum oxide or titanium dioxide.

16. The wavelength conversion element of claim 12, wherein a thickness of the scattering reflective layer is 0.05 mm to 0.2 mm.

17. The wavelength conversion element of claim 1, wherein the reflective layer of the non-wavelength conversion region is a scattering reflective layer configured to reflect the excitation light beam incident on an upper surface of the scattering reflective layer.

18. The wavelength conversion element of claim 1, wherein the wavelength conversion region is provided with a reflective layer, the reflective layer is located between the at least one wavelength conversion layer and the substrate, a material of the reflective layer of the wavelength conversion region is a metal film, and a thickness of the reflective layer of the wavelength conversion region is less than 5 μm.

19. A projection device, comprising: a light source, a wavelength conversion element, a condenser lens, a light valve, and a projection lens, wherein, the light source is configured to emit an excitation light beam;

the wavelength conversion element is disposed on a transmission path of the excitation light beam, and the wavelength conversion element comprises: a substrate and at least one wavelength conversion layer; wherein, the substrate is configured to rotate about a central axis, the substrate comprises a wavelength conversion region and a non-wavelength conversion region, and the wavelength conversion region and the non-wavelength conversion region are adjacently disposed on the substrate and form a ring shape, wherein when the substrate is rotated about the central axis, the non-wavelength conversion region and the wavelength conversion region alternately enter the transmission path of the excitation light beam; and the substrate has a recessed portion, the recessed portion is located inside or outside the wavelength conversion region and surrounds the wavelength conversion region, the recessed portion and the at least one wavelength conversion layer are located on a surface of the substrate, the recessed portion is recessed into the substrate relative to the surface, and the recessed portion comprises an inclined surface;

wherein when the excitation light beam is incident on the inclined surface, the inclined surface reflects the excitation light beam to the at least one wavelength conversion layer, when the excitation light beam is incident on the at least one wavelength conversion layer, the at least one wavelength conversion layer converts the excitation light beam into a converted beam, and when the excitation light beam is incident on the non-wavelength conversion region, the non-wavelength conversion region reflects the excitation light beam, and the wavelength conversion element outputs the converted beam or the excitation light beam as an illumination beam;

the condenser lens is disposed between the light source and the wavelength conversion element and located on a transmission path of the illumination beam;

the light valve is disposed on a transmission path of the illumination beam from the condenser lens and configured to convert the illumination beam into an image beam; and the projection lens is disposed on an optical path of the image beam.

20. The projection device of claim 19, wherein there is a spacing between the at least one wavelength conversion layer of the wavelength conversion element and the condenser lens, and the spacing is 1 to 3 times a thickness of the substrate.

* * * * *